US012603580B2

(12) United States Patent
Hariya

(10) Patent No.: US 12,603,580 B2
(45) Date of Patent: Apr. 14, 2026

(54) POWER CONVERSION APPARATUS AND POWER CONVERSION SYSTEM

(71) Applicant: TDK CORPORATION, Tokyo (JP)

(72) Inventor: Akinori Hariya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 296 days.

(21) Appl. No.: 18/294,780

(22) PCT Filed: Aug. 18, 2022

(86) PCT No.: PCT/JP2022/031172
§ 371 (c)(1),
(2) Date: Feb. 2, 2024

(87) PCT Pub. No.: WO2023/058335
PCT Pub. Date: Apr. 13, 2023

(65) Prior Publication Data
US 2024/0348173 A1     Oct. 17, 2024

(30) Foreign Application Priority Data
Oct. 6, 2021     (JP) ................................. 2021-164651

(51) Int. Cl.
H02M 3/335     (2006.01)
H02M 1/08     (2006.01)
H02M 1/36     (2007.01)
(52) U.S. Cl.
CPC ......... H02M 3/33573 (2021.05); H02M 1/08 (2013.01); H02M 1/36 (2013.01)

(58) Field of Classification Search
CPC ..... H02M 1/08; H02M 1/036; H02M 7/33537
USPC ............................................... 363/17
See application file for complete search history.

(56) References Cited

U.S. PATENT DOCUMENTS

| | | | |
|---|---|---|---|
| 9,231,488 B2 * | 1/2016 | Zhu ........................ | H02M 1/10 |
| 9,257,913 B1 * | 2/2016 | McDonald .......... | H02M 3/3376 |
| 11,233,457 B2 * | 1/2022 | Kawamura ....... | H02M 3/33573 |
| 2012/0275196 A1 * | 11/2012 | Chapman ............... | H02M 1/08 |
| | | | 363/17 |

FOREIGN PATENT DOCUMENTS

JP     2019-205293 A     11/2019

* cited by examiner

*Primary Examiner* — Yemane Mehari
(74) *Attorney, Agent, or Firm* — Oliff PLC

(57)     ABSTRACT

A power conversion apparatus includes: a first power terminal; a switching circuit including first switching devices configured to be turned on/off based on a first driving signal; a transformer; a rectifying circuit including second switching devices configured to be turned on/off based on a second driving signal; a smoothing circuit; a second power terminal; and a control circuit. In a first period before electric power is supplied from the first power terminal toward the second power terminal, the control circuit generates a first threshold increasing with the passage of time, and performs, when a voltage value of a voltage at the first power terminal reaches the first threshold, switching from an output state in which the second driving signal is outputted to an output stop state in which output of the second driving signal is stopped, or switching from the output stop state to the output state.

13 Claims, 17 Drawing Sheets

[ FIG. 3 ]
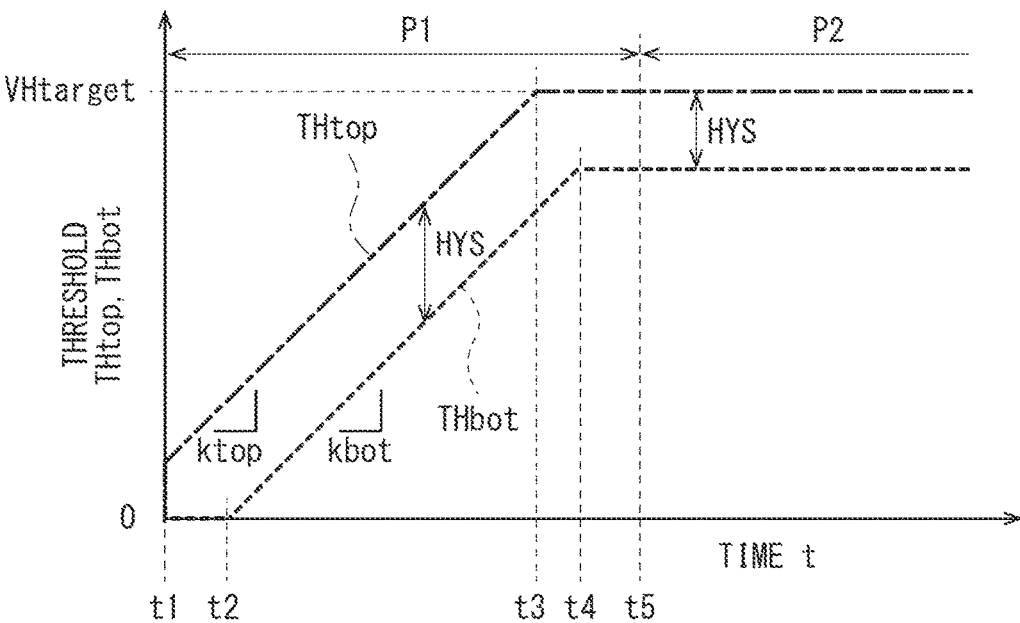
[ FIG. 4 ]
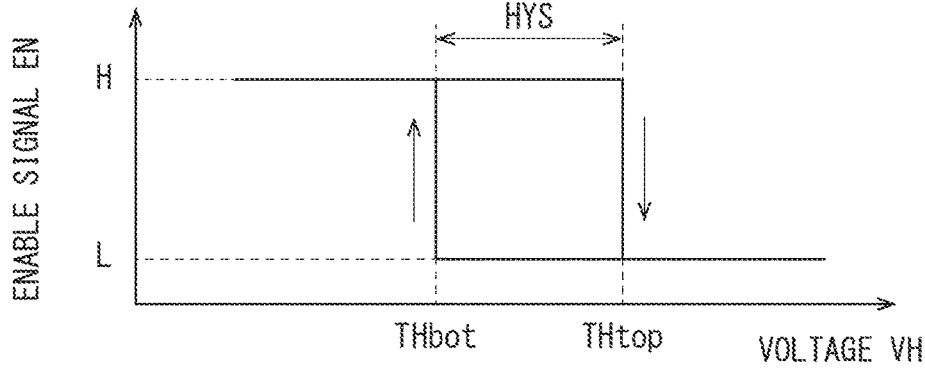
[ FIG. 5 ]
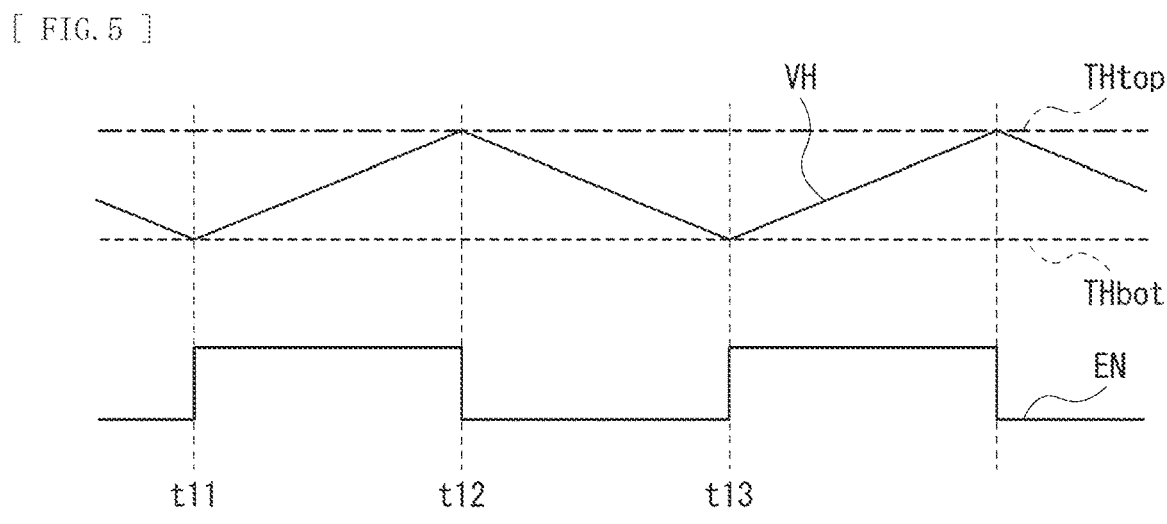

[ FIG. 7 ]
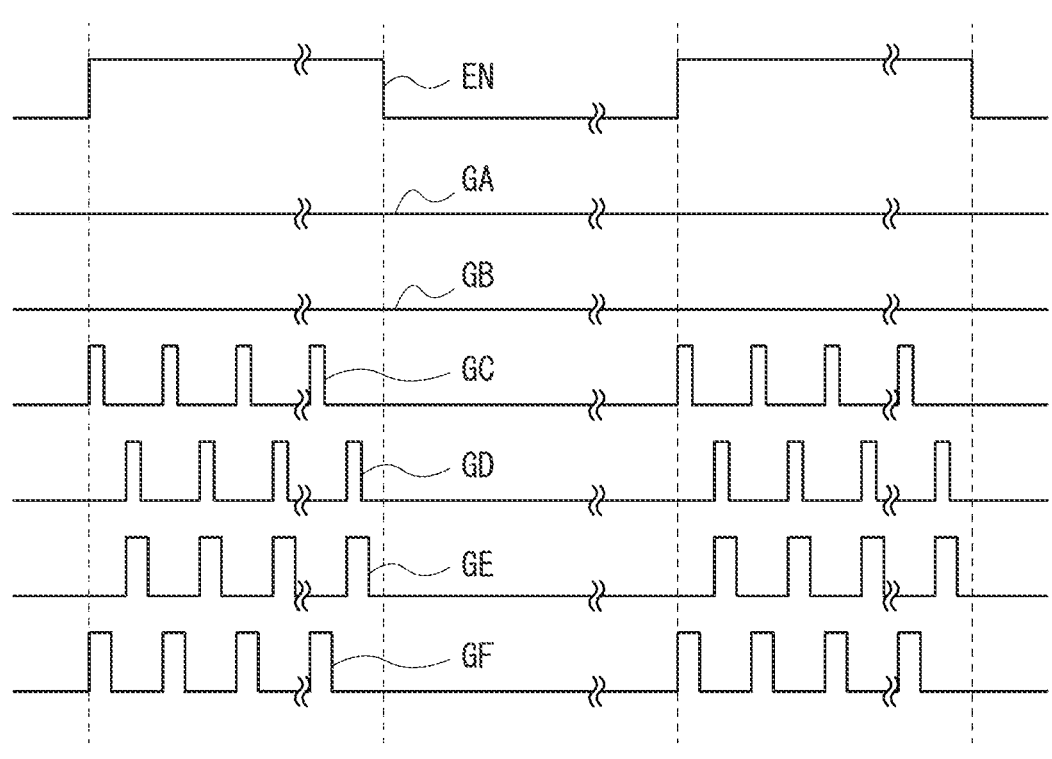

[ FIG. 8 ]
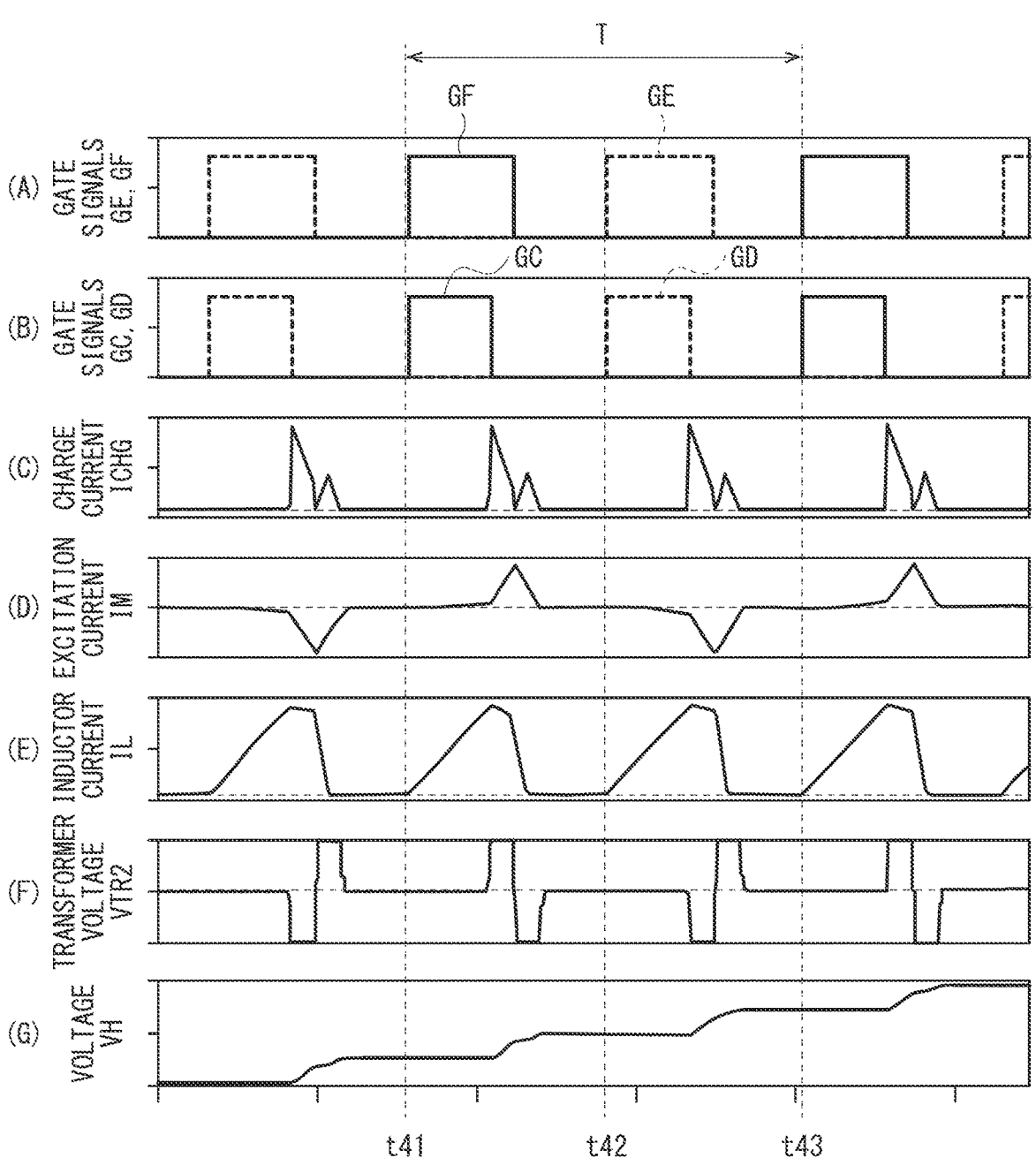

[ FIG. 9 ]
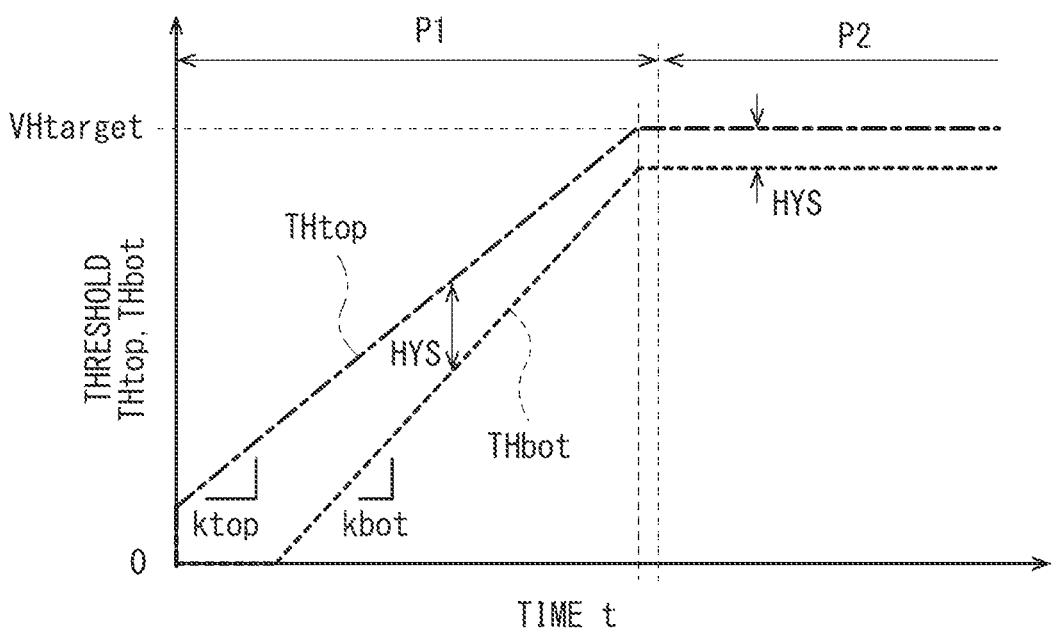
[ FIG. 10 ]
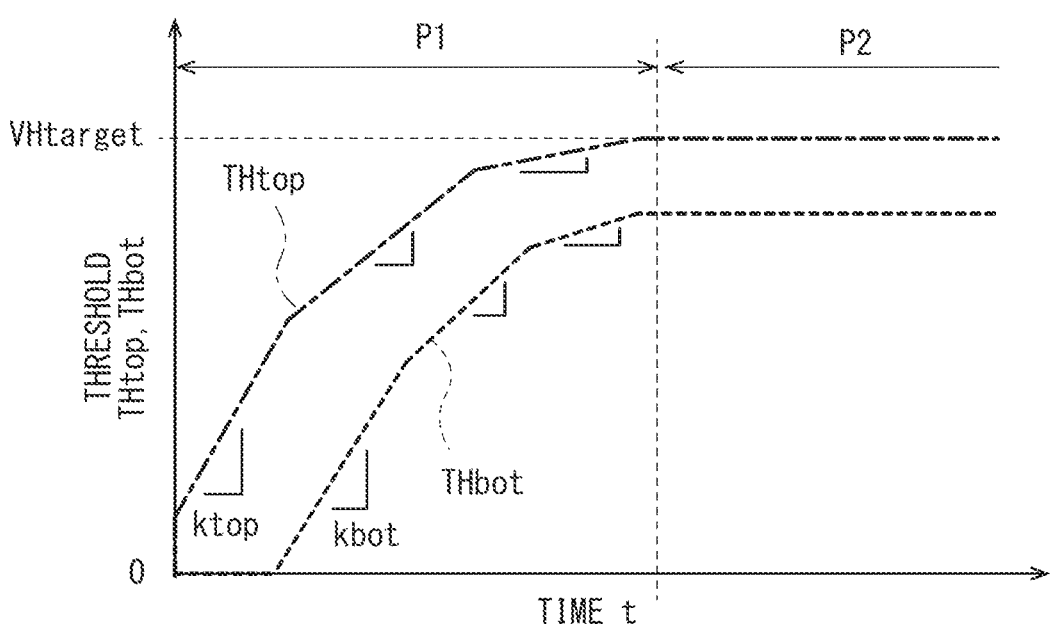

(A) ENABLE SIGNAL EN (B) DUTY RATIO DS (C) DUTY RATIO DP (D) VOLTAGE VH
    THRESHOLD
    THtop, THbot

P1

THtop

THbot

VH t81   t82   t83   t84

POWER CONVERSION APPARATUS AND POWER CONVERSION SYSTEM

TECHNICAL FIELD

The disclosure relates to a power conversion apparatus and a power conversion system that each convert electric power.

BACKGROUND ART

Some of power conversion apparatuses that convert electric power of a primary-side battery and supply the converted electric power to a secondary-side battery perform what is called a precharge operation before performing the power conversion operation. The precharge operation is an operation of supplying electric power of the secondary-side battery to a primary-side capacitor via the power conversion apparatus. For example, Patent Literature 1 discloses a technique of controlling a current in the precharge operation.

CITATION LIST

Patent Literature

Patent Literature 1: Japanese Unexamined Patent Application Publication No. 2019-205293

SUMMARY

A power conversion apparatus according to an embodiment of the disclosure includes a first power terminal, a switching circuit, a transformer, a rectifying circuit, a smoothing circuit, a second power terminal, and a control circuit. The switching circuit is coupled to the first power terminal and includes a plurality of first switching devices. The first switching devices are configured to be turned on and off based on a first driving signal. The transformer includes a first winding and a second winding. The first winding is coupled to the switching circuit. The rectifying circuit is coupled to the second winding and includes a plurality of second switching devices. The second switching devices are configured to be turned on and off based on a second driving signal. The smoothing circuit is coupled to the rectifying circuit. The second power terminal is coupled to the smoothing circuit. The control circuit is configured to control operations of the first switching devices and the second switching devices. The control circuit is configured to, in a first period before electric power is supplied from the first power terminal toward the second power terminal, generate a first threshold that increases with the passage of time, and perform, when a voltage value of a voltage at the first power terminal reaches the first threshold, switching from an output state to an output stop state, or switching from the output stop state to the output state. The output state is a state in which the second driving signal is outputted. The output stop state is a state in which output of the second driving signal is stopped. A power conversion system according to an embodiment of the disclosure includes a first battery, a capacitor, a first switch, a second switch, a power conversion apparatus, and a second battery. The first battery includes a first terminal and a second terminal. The capacitor includes a first terminal and a second terminal. The first switch is provided on a path coupling the first terminal of the first battery and the first terminal of the capacitor to each other. The second switch is provided on a path coupling the second terminal of the first battery and the second terminal of the capacitor to each other. The power conversion apparatus includes a first power terminal, a switching circuit, a transformer, a rectifying circuit, a smoothing circuit, a second power terminal, and a control circuit. The first power terminal includes a first coupling terminal and a second coupling terminal. The first coupling terminal is coupled the first terminal of the capacitor. The second coupling terminal is coupled to the second terminal of the capacitor. The switching circuit is coupled to the first power terminal and includes a plurality of first switching devices. The first switching devices are configured to be turned on and off based on a first driving signal. The transformer includes a first winding and a second winding. The first winding is coupled to the switching circuit. The rectifying circuit is coupled to the second winding and includes a plurality of second switching devices. The second switching devices are configured to be turned on and off based on a second driving signal. The smoothing circuit is coupled to the rectifying circuit. The second power terminal is coupled to the smoothing circuit. The control circuit is configured to control operations of the first switching devices and the second switching devices. The control circuit is configured to, in a first period before electric power is supplied from the first power terminal toward the second power terminal, generate a first threshold that increases with the passage of time, and perform, when a voltage value of a voltage at the first power terminal reaches the first threshold, switching from an output state to an output stop state, or switching from the output stop state to the output state. The output state is a state in which the second driving signal is outputted. The output stop state is a state in which output of the second driving signal is stopped.

BRIEF DESCRIPTION OF DRAWINGS

FIG. 3 is an explanatory diagram illustrating an operation example of a threshold generator illustrated in FIG. 2.

FIG. 4 is an explanatory diagram illustrating a characteristic example of a comparison operation of a comparator illustrated in FIG. 2.

FIG. 5 is a timing chart illustrating an operation example of the comparator illustrated in FIG. 2.

FIG. 7 is a timing waveform diagram illustrating a relationship between an enable signal illustrated in FIG. 6 and gate signals.

FIG. 8 is a timing waveform diagram illustrating an example of the precharge operation of the power conversion system illustrated in FIG. 1.

FIG. 9 is an explanatory diagram illustrating an operation example of a threshold generator according to a modification example.

FIG. 10 is an explanatory diagram illustrating an operation example of a threshold generator according to another modification example.

FIG. 18 is a timing chart illustrating an example of the precharge operation of a power conversion system including the control circuit illustrated in FIG. 7.

DETAILED DESCRIPTION

In a power conversion apparatus that performs such a precharge operation, for example, a voltage of the primary-side capacitor is becoming smaller in the amount of change as charging proceeds, and therefore it takes a long time to complete the charging. Further, for example, a charge time involved in the precharge operation and a gradient of voltage in the precharge operation can vary depending on a capacitance value of the primary-side capacitor. Such a charge characteristic of the precharge operation is desirably settable to a predetermined characteristic, for example. The power conversion apparatus desirably allows for such setting of the charge characteristic with a simple configuration.

It is desirable to provide a power conversion apparatus and a power conversion system that each make it possible to set a charge characteristic of a precharge operation with a simple configuration.

Some embodiments of the disclosure will be described in detail below with reference to the drawings.

EMBODIMENT

Configuration Example

Figure 1:
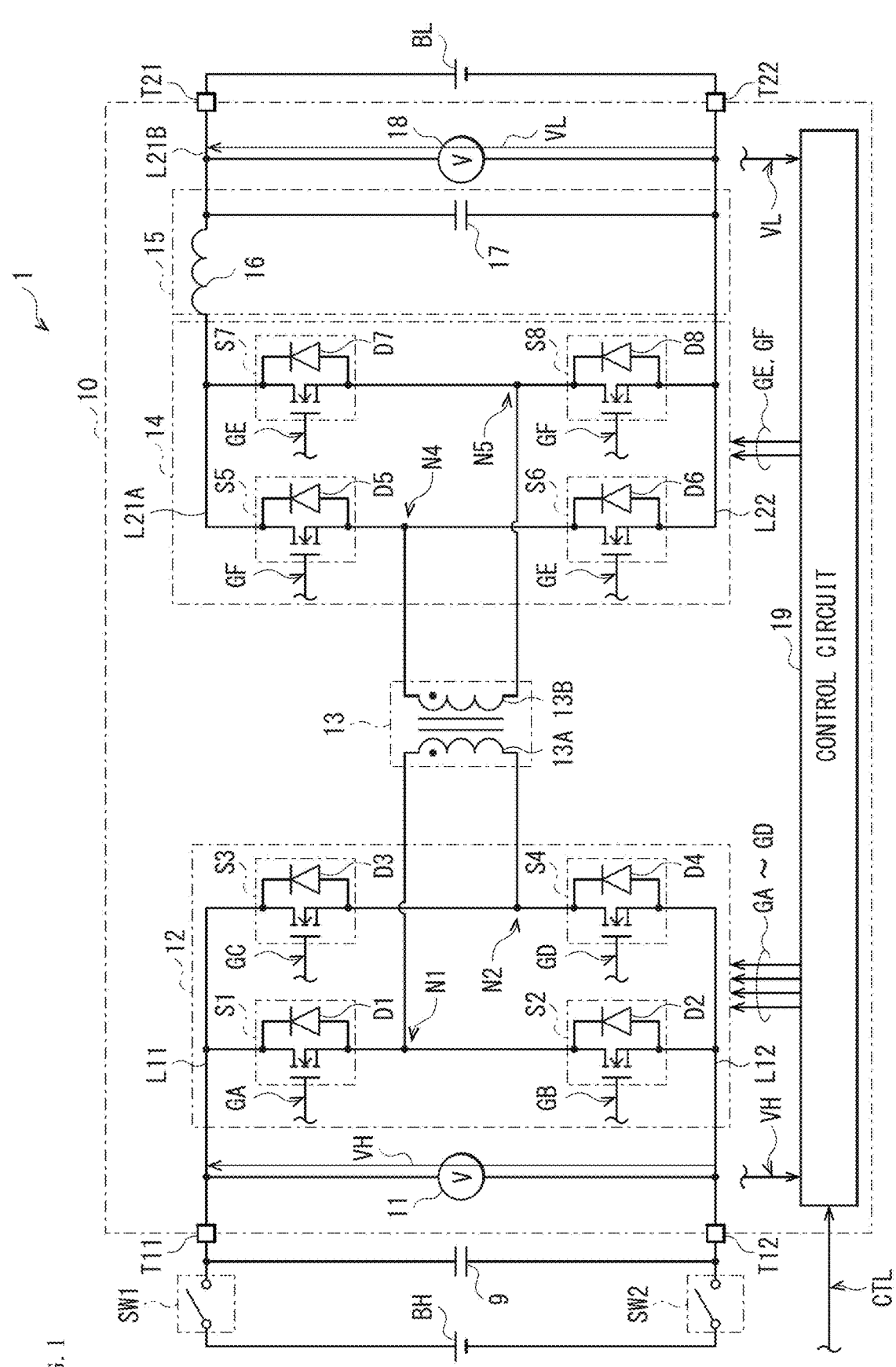
FIG. 1 is a circuit diagram illustrating a configuration example of a power conversion system according to one embodiment of the disclosure.

FIG. 1 illustrates a configuration example of a power conversion system 1 including a power conversion apparatus according to an embodiment of the disclosure. The power conversion system 1 includes a high voltage battery BH, switches SW1 and SW2, a capacitor 9, a power conversion apparatus 10, and a low voltage battery BL. The power conversion system 1 is configured to convert electric power supplied from the high voltage battery BH and to supply converted electric power to the low voltage battery BL.

The high voltage battery BH is configured to store electric power. The high voltage battery BH supplies the electric power to the power conversion apparatus 10 via the switches SW1 and SW2.

The switches SW1 and SW2 are configured to supply the electric power stored in the high voltage battery BH to the power conversion apparatus 10 by being turned on. The switches SW1 and SW2 each include a relay, for example. The switch SW1 couples a positive terminal of the high voltage battery BH and a terminal T11 of the power conversion apparatus 10 to each other by being turned on. The switch SW2 couples a negative terminal of the high voltage battery BH and a terminal T12 of the power conversion apparatus 10 to each other by being turned on. The switches SW1 and SW2 are turned on and off in accordance with instructions provided by an unillustrated system controller.

The capacitor 9 has one end coupled to the terminal T11 of the power conversion apparatus 10 and to the switch SW1, and another end coupled to the terminal T12 of the power conversion apparatus 10 and to the switch SW2.

The power conversion apparatus 10 is configured to step down a voltage received from the high voltage battery BH to thereby convert the electric power, and to supply the converted electric power to the low voltage battery BL. The power conversion apparatus 10 includes the terminals T11 and T12, a voltage sensor 11, a switching circuit 12, a transformer 13, a rectifying circuit 14, a smoothing circuit 15, a voltage sensor 18, a control circuit 19, and terminals T21 and T22. The high voltage battery BH, the switches SW1 and SW2, the capacitor 9, the voltage sensor 11, and the switching circuit 12 configure primary-side circuitry of the power conversion system 1. The rectifying circuit 14, the smoothing circuit 15, the voltage sensor 18, and the low voltage battery BL configure secondary-side circuitry of the power conversion system 1.

The terminals T11 and T12 are configured to be supplied with a voltage from the high voltage battery BH upon turning-on of the switches SW1 and SW2. In the power conversion apparatus 10, the terminal T11 is coupled to a voltage line L11, and the terminal T12 is coupled to a reference voltage line L12.

The voltage sensor 11 is configured to detect a voltage at the voltage line L11. The voltage sensor 11 has one end coupled to the voltage line L11, and another end coupled to the reference voltage line L12. The voltage sensor 11 detects, as a voltage VH, the voltage at the voltage line L11 relative to a voltage at the reference voltage line L12. Further, the voltage sensor 11 supplies a result of detection of the voltage VH to the control circuit 19.

The switching circuit 12 is configured to convert a direct-current voltage supplied from the high voltage battery BH into an alternating-current voltage. The switching circuit 12 is a full-bridge circuit, and includes transistors S1 to S4. The transistors S1 to S4 are switching devices that perform switching operations, respectively based on gate signals GA to GD. The transistors S1 to S4 each include an N-type field-effect transistor (FET), for example. The transistors S1 to S4 include body diodes D1 to D4, respectively. For example, the body diode D1 has an anode coupled to a source of the transistor S1, and a cathode coupled to a drain of the transistor S1. The same applies to the body diodes D2 to D4. Note that such a configuration is non-limiting. For example, an external diode device may be provided between the drain and the source of each of the transistors S1 to S4. Further, although the N-type field-effect transistor is used in this example, any kind of switching device may be used.

The transistor S1 is provided on a path coupling the voltage line L11 and a node N1 to each other, and is configured to couple the node N1 to the voltage line L11 by being turned on. The transistor S1 has the drain coupled to the voltage line L11, a gate to be supplied with the gate signal GA, and the source coupled to the node N1. The transistor S2 is provided on a path coupling the node N1 and the reference voltage line L12 to each other, and is configured to couple the node N1 to the reference voltage line L12 by being turned on. The transistor S2 has the drain coupled to the node N1, a gate to be supplied with the gate signal GB, and the source coupled to the reference voltage line L12. The node N1 is a coupling point between the source of the transistor S1 and the drain of the transistor S2.

The transistor S3 is provided on a path coupling the voltage line L11 and a node N2 to each other, and is configured to couple the node N2 to the voltage line L11 by being turned on. The transistor S3 has the drain coupled to the voltage line L11, a gate to be supplied with the gate signal GC, and the source coupled to the node N2. The transistor S4 is provided on a path coupling the node N2 and the reference voltage line L12 to each other, and is configured to couple the node N2 to the reference voltage line L12 by being turned on. The transistor S4 has the drain coupled to the node N2, a gate to be supplied with the gate signal GD, and the source coupled to the reference voltage line L12. The node N2 is a coupling point between the source of the transistor S3 and the drain of the transistor S4.

The transformer 13 is configured to provide direct-current isolation and alternating-current coupling between the primary-side circuitry and the secondary-side circuitry, and to convert an alternating-current voltage supplied from the primary-side circuitry with a transformation ratio N of the transformer 13 to thereby supply the converted alternating-current voltage to the secondary-side circuitry. The transformer 13 includes windings 13A and 13B. The winding 13A has one end coupled to the node N1 in the switching circuit 12, and another end coupled to the node N2 in the switching circuit 12. The winding 13B has one end coupled to a node N4 (described later) in the rectifying circuit 14, and another end coupled to a node N5 (described later) in the rectifying circuit 14.

The rectifying circuit 14 is configured to rectify the alternating-current voltage outputted from the winding 13B of the transformer 13 to thereby generate an output voltage. The rectifying circuit 14 is a full-bridge circuit, and includes transistors S5 to S8. The transistors S5 to S8 are each configured to perform a switching operation, based on a gate signal GE or GF. The transistors S5 to S8 each include, for example, an N-type field-effect transistor, as with the transistors S1 to S4 of the switching circuit 12. The transistors S5 to S8 include body diodes D5 to D8, respectively, as with the transistors S1 to S4.

The transistor S5 is provided on a path coupling a voltage line L21A and the node N4 to each other, and is configured to couple the node N4 to the voltage line L21A by being turned on. The transistor S5 has a drain coupled to the voltage line L21A, a gate to be supplied with the gate signal GF, and a source coupled to the node N4. The transistor S6 is provided on a path coupling the node N4 and a reference voltage line L22 to each other, and is configured to couple the node N4 to the reference voltage line L22 by being turned on. The transistor S6 has a drain coupled to the node N4, a gate to be supplied with the gate signal GE, and a source coupled to the reference voltage line L22. The node N4 is a coupling point between the source of the transistor S5 and the drain of the transistor S6.

The transistor S7 is provided on a path coupling the voltage line L21A and the node N5 to each other, and is configured to couple the node N5 to the voltage line L21A by being turned on. The transistor S7 has a drain coupled to the voltage line L21A, a gate to be supplied with the gate signal GE, and a source coupled to the node N5. The transistor S8 is provided on a path coupling the node N5 and the reference voltage line L22 to each other, and is configured to couple the node N5 to the reference voltage line L22 by being turned on. The transistor S8 has a drain coupled to the node N5, a gate to be supplied with the gate signal GF, and a source coupled to the reference voltage line L22. The node N5 is a coupling point between the source of the transistor S7 and the drain of the transistor S8.

The smoothing circuit 15 is configured to smooth the output voltage of the rectifying circuit 14. The smoothing circuit 15 includes a choke inductor 16 and a capacitor 17. The choke inductor 16 has one end coupled to the voltage line L21A, and another end coupled to a voltage line L21B. The capacitor 17 has one end coupled to the voltage line L21B, and another end coupled to the reference voltage line L22. Note that although the choke inductor 16 is provided on the voltage lines L21A and L21B in this example, this is non-limiting. Alternatively, for example, the choke inductor 16 may be provided on the reference voltage line L22.

The voltage sensor 18 is configured to detect a voltage at the voltage line L21B. The voltage sensor 18 has one end coupled to the voltage line L21B, and another end coupled to the reference voltage line L22. The voltage sensor 18 detects, as a voltage VL, the voltage at the voltage line L21B relative to a voltage at the reference voltage line L22. Further, the voltage sensor 18 supplies a result of detection of the voltage VL to the control circuit 19.

The control circuit 19 is configured to control an operation of the power conversion apparatus 10 by controlling operations of the switching circuit 12 and the rectifying circuit 14, based on the voltage VH detected by the voltage sensor 11, the voltage VL detected by the voltage sensor 18, and control data CTL supplied from an unillustrated system controller. Specifically, the control circuit 19 controls the operation of the power conversion apparatus 10 by generating the gate signals GA to GF, based on the voltages VH and VL, and performing pulse width modulation (PWM) control through the use of the gate signals GA to GF. The control circuit 19 includes a microcontroller, for example. The control circuit 19 subjects the supplied voltages VH and VL to AD conversion, and performs processing, based on digital values obtained by the AD conversion. Hereinafter, as appropriate, the voltages VH and VL are used to represent the digital values obtained by the AD conversion.

The terminals T21 and T22 are configured to supply a voltage generated by the power conversion apparatus 10 to the low voltage battery BL. In the power conversion apparatus 10, the terminal T21 is coupled to the voltage line L21B, and the terminal T22 is coupled to the reference voltage line L22. Further, the terminal T21 is coupled to a positive terminal of the low voltage battery BL, and the terminal T22 is coupled to a negative terminal of the low voltage battery BL.

The low voltage battery BL is configured to store the electric power supplied from the power conversion apparatus 10.

With this configuration, the power conversion system 1 performs a power conversion operation of converting electric power supplied from the high voltage battery BH and supplying the converted electric power to the low voltage battery BL.

Further, the power conversion system 1 also has a function of performing what is called a precharge operation, that is, an operation of charging the capacitor 9 during a preparation period (a precharge period P1) before the power conversion operation described above is started. During the precharge operation, the switches SW1 and SW2 are off, and the control circuit 19 controls the operations of the switching circuit 12 and the rectifying circuit 14 to thereby cause the power conversion system 1 to supply the electric power of the low voltage battery BL to the capacitor 9. This makes it possible for the power conversion apparatus 10 to reduce an inrush current flowing from the high voltage battery BH to the capacitor 9 when the switches SW1 and SW2 are turned on to perform the power conversion operation.

Figure 2:
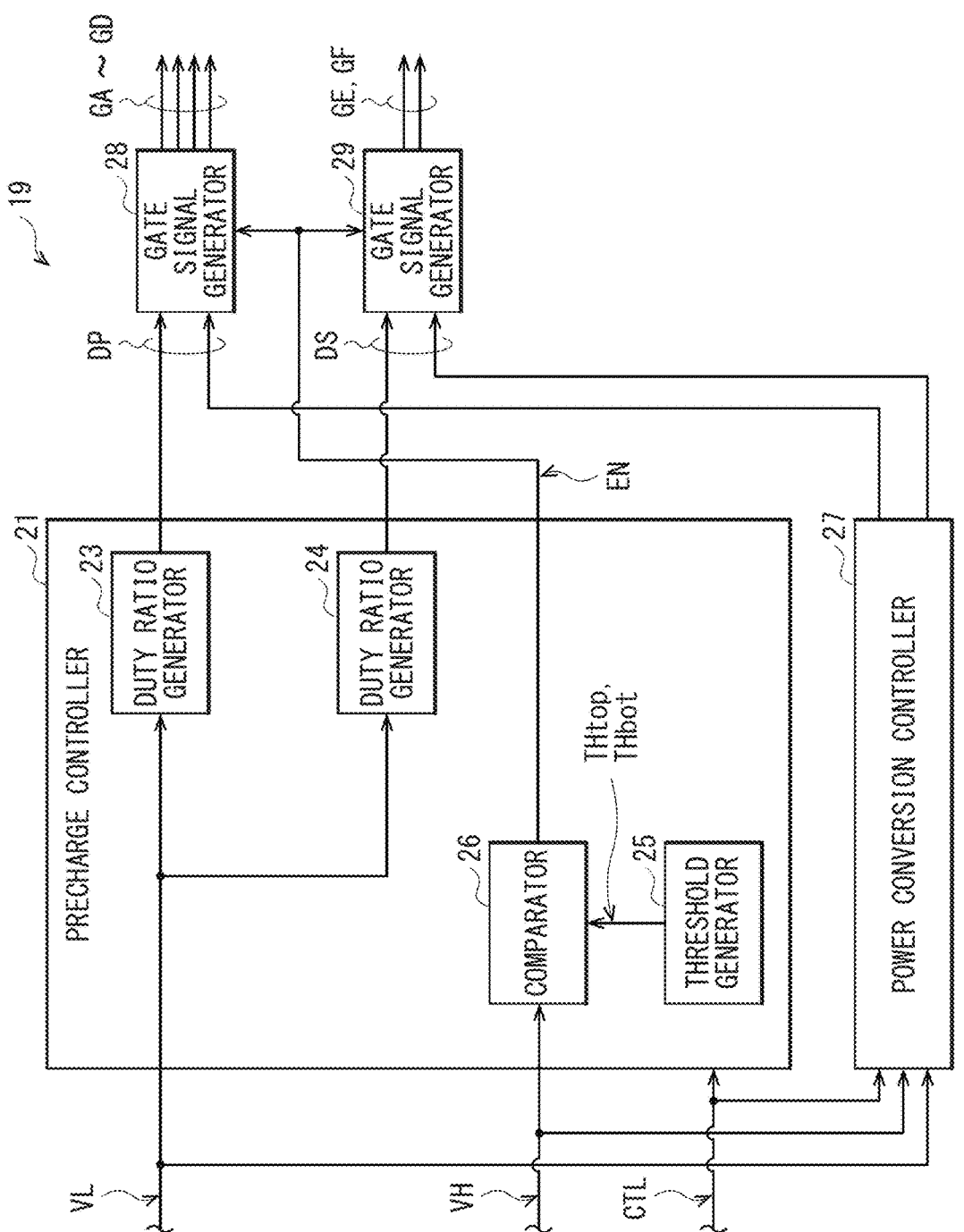
FIG. 2 is a block diagram illustrating a configuration example of a control circuit illustrated in FIG. 1.

FIG. 2 illustrates a configuration example of the control circuit 19. The control circuit 19 includes a precharge controller 21, a power conversion controller 27, and gate signal generators 28 and 29.

The precharge controller 21 is configured to, in the precharge period P1 and a period (a voltage-maintaining period P2) subsequent to the precharge period P1, generate a duty ratio DP of the switching operation of the switching circuit 12 and a duty ratio DS of the switching operation of the rectifying circuit 14, based on the voltage VL. Further, the precharge controller 21 has a function of generating, based on the voltage VH, an enable signal EN indicating whether the control circuit 19 is to output the gate signals GA to GF. The precharge controller 21 includes duty ratio generators 23 and 24, a threshold generator 25, and a comparator 26.

The duty ratio generator 23 is configured to generate the duty ratio DP of the switching circuit 12, based on the voltage VL, in the precharge period P1 and the voltage-maintaining period P2. Specifically, in the precharge period P1, the duty ratio generator 23 generates the duty ratio DP in such a manner that the higher the voltage VL, the lower the duty ratio DP. For example, the duty ratio generator 23 may use a mathematical function such as "DP=X1/VL" to generate the duty ratio DP, based on the voltage VL. Here, "X1" is any constant that has a dimension of the voltage and is smaller than the value of the voltage VL. Alternatively, for example, the duty ratio generator 23 may use table data indicating a relationship between the duty ratio DP and the voltage VL to generate the duty ratio DP, based on the voltage VL. In the precharge period P1, the duty ratio generator 23 generates the duty ratio DP to cause the duty ratio DP to gradually increase. This makes it possible to reduce a current stress in circuitry in the power conversion system 1. Further, in the voltage-maintaining period P2, the duty ratio generator 23 generates the duty ratio DP of a predetermined value corresponding to the voltage VL, for example. Note that this is non-limiting, and the duty ratio generator 23 may, in the voltage-maintaining period P2, generate the duty ratio DP by performing feedback control, based on the voltage VL.

The duty ratio generator 24 is configured to generate the duty ratio DS of the rectifying circuit 14, based on the voltage VL, in the pre-charge period P1 and the voltage-maintaining period P2. Specifically, in the precharge period P1, the duty ratio generator 24 generates the duty ratio DS in such a manner that the higher the voltage VL, the lower the duty ratio DS. For example, the duty ratio generator 24 may use a mathematical function such as "DS=X2/VL" to generate the duty ratio DS, based on the voltage VL. Here, "X2" is any constant that has a dimension of the voltage and is smaller than the value of the voltage VL. Alternatively, for example, the duty ratio generator 24 may use table data indicating a relationship between the duty ratio DS and the voltage VL to generate the duty ratio DS, based on the voltage VL. In the precharge period P1, the duty ratio generator 24 generates the duty ratio DS to cause the duty ratio DS to gradually increase. This makes it possible to reduce the current stress in the circuitry in the power conversion system 1. Further, in the voltage-maintaining period P2, the duty ratio generator 24 generates the duty ratio DS of a predetermined value corresponding to the voltage VL, for example. Note that this is non-limiting, and the duty ratio generator 24 may, in the voltage-maintaining period P2, generate the duty ratio DS by performing feedback control, based on the voltage VL.

The threshold generator 25 is configured to generate thresholds THtop and THbot, based on a target voltage command value VHtarget of the voltage VH included in the control data CTL, in the precharge period P1 and the voltage-maintaining period P2. The threshold THtop is a value corresponding to an upper-limit voltage of the voltage VH, and the threshold THbot is a value corresponding to a lower-limit voltage of the voltage VH.

FIG. 3 illustrates an example of the thresholds THtop and THbot. In this example, the threshold generator 25 causes the threshold THtop to linearly increase with the passage of time from a timing t1 at which the precharge period P1 starts onward, and causes the threshold THtop to stop changing at and after a timing t3. The value of the threshold THtop at and after the timing t3 is the target voltage command value VHtarget. Note that although the value of the threshold THtop at and after the timing t3 is equal to the target voltage command value VHtarget in this example, this is non-limiting. For example, the value of the threshold THtop at and after the timing t3 may be equal to the target voltage command value VHtarget plus a value ΔV, i.e., VHtarget+ΔV. Here, ΔV is any value corresponding to the target voltage command value VHtarget. Further, the threshold generator 25 causes the threshold THbot to linearly increase with the passage of time from a timing t2 after the timing t1 onward, and causes the threshold THbot to stop changing at and after a timing t4 after the timing t3. The threshold THtop is greater than the threshold THbot. In this example, a gradient ktop of the threshold THtop during a period from the timing t1 to the timing t3 is equal to a gradient kbot of the threshold THbot during a period from the timing t2 to the timing t4.

As will be described later, the voltage VH is controlled to fall within a voltage range greater than or equal to the threshold THbot and less than or equal to the threshold THtop. Further, at a timing (in this example, a timing t5) at which the voltage VH reaches the target voltage command value VHtarget, the precharge period P1 ends and the voltage-maintaining period P2 starts. Thereafter, the voltage-maintaining period P2 ends and a power conversion period P3 starts during which the power conversion operation is performed.

The threshold generator 25 generates such thresholds THtop and THbot using a mathematical function or table data, for example. Further, the threshold generator 25 supplies the thresholds THtop and THbot to the comparator 26.

The comparator 26 (FIG. 2) is configured to generate, in the precharge period P1 and the voltage-maintaining period P2, the enable signal EN by making comparisons between the voltage VH and the thresholds THtop and THbot.

FIG. 4 illustrates a characteristic example of a comparison operation performed by the comparator 26. When the voltage VH is lower than the threshold THbot, the comparator 26 sets the enable signal EN to a high level. Thereafter, once the voltage VH gradually rises to reach the threshold THtop, the comparator 26 changes the enable signal EN from the high level to a low level. In contrast, when the voltage VH is higher than the threshold THtop, the comparator 26 sets the enable signal EN to the low level. Thereafter, once the voltage VH gradually drops to reach the threshold THbot, the comparator 26 changes the enable signal EN from the low level to the high level. In such a manner, a comparison characteristic of the comparator 26 exhibits a hysteresis characteristic in which a difference between the threshold THtop and the threshold THbot is taken as a hysteresis amount HYS.

In the example of FIG. 3, the gradient ktop of the threshold THtop during the period from the timing t1 to the timing t3 is equal to the gradient kbot of the threshold THbot during the period from the timing t2 to the timing t4. The hysteresis amount HYS is therefore constant during a period form the timing t2 to the timing t3. Further, in this example, the hysteresis amount HYS during the period during which the thresholds THtop and THbot increase is greater than the hysteresis amount HYS during the voltage-maintaining period P2. However, this is non-limiting. For example, the hysteresis amount HYS during the period during which the thresholds THtop and THbot increase may be equal to the hysteresis amount HYS during the voltage-maintaining period P2.

FIG. 5 illustrates an operation example of the comparator 26. For example, at a timing t11, the enable signal EN changes from the low level to the high level. As will be described later, once the enable signal EN changes to the high level, the control circuit 19 outputs the gate signals GA to GF. The power conversion apparatus 10 performs the switching operation, based on the gate signals GA to GF. Thus, the power conversion apparatus 10 supplies the electric power of the low voltage battery BL to the capacitor 9 and raises the voltage VH accordingly. Thereafter, once the voltage VH reaches the threshold THtop at a timing t12, the comparator 26 changes the enable signal EN from the high level to the low level. As will be described later, once the enable signal EN changes to the low level, the control circuit 19 maintains the gate signals GA to GF at the low level. As a result, the power conversion apparatus 10 stops the switching operation, and the voltage VH drops. Thereafter, once the voltage VH reaches the threshold THbot at a timing t13, the comparator 26 changes the enable signal EN from the low level to the high level. Subsequent operations are performed in a similar manner.

In such a manner, the comparator 26 generates the enable signal EN in the precharge period P1 and the voltage-maintaining period P2, by making comparisons between the voltage VH and the thresholds THtop and THbot. Further, the comparator 26 maintains the enable signal EN at the high level during the power conversion period P3.

The power conversion controller 27 (FIG. 2) is configured to generate, in the power conversion period P3, the duty ratio DP of the switching operation of the switching circuit 12 and the duty ratio DS of the switching operation of the rectifying circuit 14, based on the voltages VH and VL, and the control data CTL supplied from the unillustrated system controller.

The gate signal generator 28 is configured to generate the gate signals GA to GD, based on the duty ratio DP generated by the duty ratio generator 23 or the power conversion controller 27, and the enable signal EN. Specifically, in the precharge period P1 and the voltage-maintaining period P2, when the enable signal EN is at the high level, the gate signal generator 28 generates the gate signals GC and GD, based on the duty ratio DP generated by the duty ratio generator 23, and maintains the gate signals GA and GB at the low level; and when the enable signal EN is at the low level, the gate signal generator 28 maintains the gate signals GA to GD at the low level. Further, in the power conversion period P3, the gate signal generator 28 generates the gate signals GA to GD, based on the duty ratio DP generated by the power conversion controller 27.

The gate signal generator 29 is configured to generate the gate signals GE and GF, based on the duty ratio DS generated by the duty ratio generator 24 or the power conversion controller 27, and the enable signal EN. Specifically, in the precharge period P1 and the voltage-maintaining period P2, when the enable signal EN is at the high level, the gate signal generator 29 generates the gate signals GE and GF, based on the duty ratio DS generated by the duty ratio generator 24; and when the enable signal EN is at the low level, the gate signal generator 29 maintains the gate signals GE and GF at the low level. Further, in the power conversion period P3, the gate signal generator 29 generates the gate signals GE and GF, based on the duty ratio DS generated by the power conversion controller 27.

Here, the terminals T11 and T12 correspond to a specific example of a "first power terminal" in one embodiment of the disclosure. The terminal T11 corresponds to a specific example of a "first coupling terminal" in one embodiment of the disclosure. The terminal T12 corresponds to a specific example of a "second coupling terminal" in one embodiment of the disclosure. The switching circuit 12 corresponds to a specific example of a "switching circuit" in one embodiment of the disclosure. The transformer 13 corresponds to a specific example of a "transformer" in one embodiment of the disclosure. The winding 13A corresponds to a specific example of a "first winding" in one embodiment of the disclosure. The winding 13B corresponds to a specific example of a "second winding" in one embodiment of the disclosure. The rectifying circuit 14 corresponds to a specific example of a "rectifying circuit" in one embodiment of the disclosure. The smoothing circuit 15 corresponds to a specific example of a "smoothing circuit" in one embodiment of the disclosure. The control circuit 19 corresponds to a specific example of a "control circuit" in one embodiment of the disclosure. The threshold THbot corresponds to a specific example of a "first threshold" in one embodiment of the disclosure. The threshold THtop corresponds to a specific example of a "second threshold" in one embodiment of the disclosure. The comparator 26 corresponds to a specific example of a "comparator" in one embodiment of the disclosure. The duty ratio generator 24 corresponds to a specific example of a "duty ratio generator" in one embodiment of the disclosure. The gate signal generator 29 corresponds to a specific example of a "driver" in one embodiment of the disclosure.

[Operation and Workings]

Next, a description will be given of operation and workings of the power conversion system 1 of the present embodiment.

(Outline of Overall Operation)

First, an outline of an overall operation of the power conversion system 1 will be described with reference to FIGS. 1 and 2. The switches SW1 and SW2 are off when the power conversion system 1 starts up. First, in the precharge period P1 and the voltage-maintaining period P2, the control circuit 19 generates the gate signals GC to GF, based on the voltages VH and VL and the control data CTL, and maintains the gate signals GA and GB at the low level. This causes the switching circuit 12 and the rectifying circuit 14 to operate and causes the power conversion apparatus 10 to supply electric power of the low voltage battery BL to the capacitor 9. As a result, the capacitor 9 is charged, and the voltage VH rises and is maintained at or near a voltage indicated by the target voltage command value VHtarget. Thereafter, in the power conversion period P3, the switches SW1 and SW2 are turned on and the control circuit 19 generates the gate signals GA to GF, based on the voltages VH and VL. This causes the power conversion apparatus 10 to convert electric power supplied from the high voltage battery BH and to supply the converted electric power to the low voltage battery BL.

(Detailed Operation)

Figure 6:
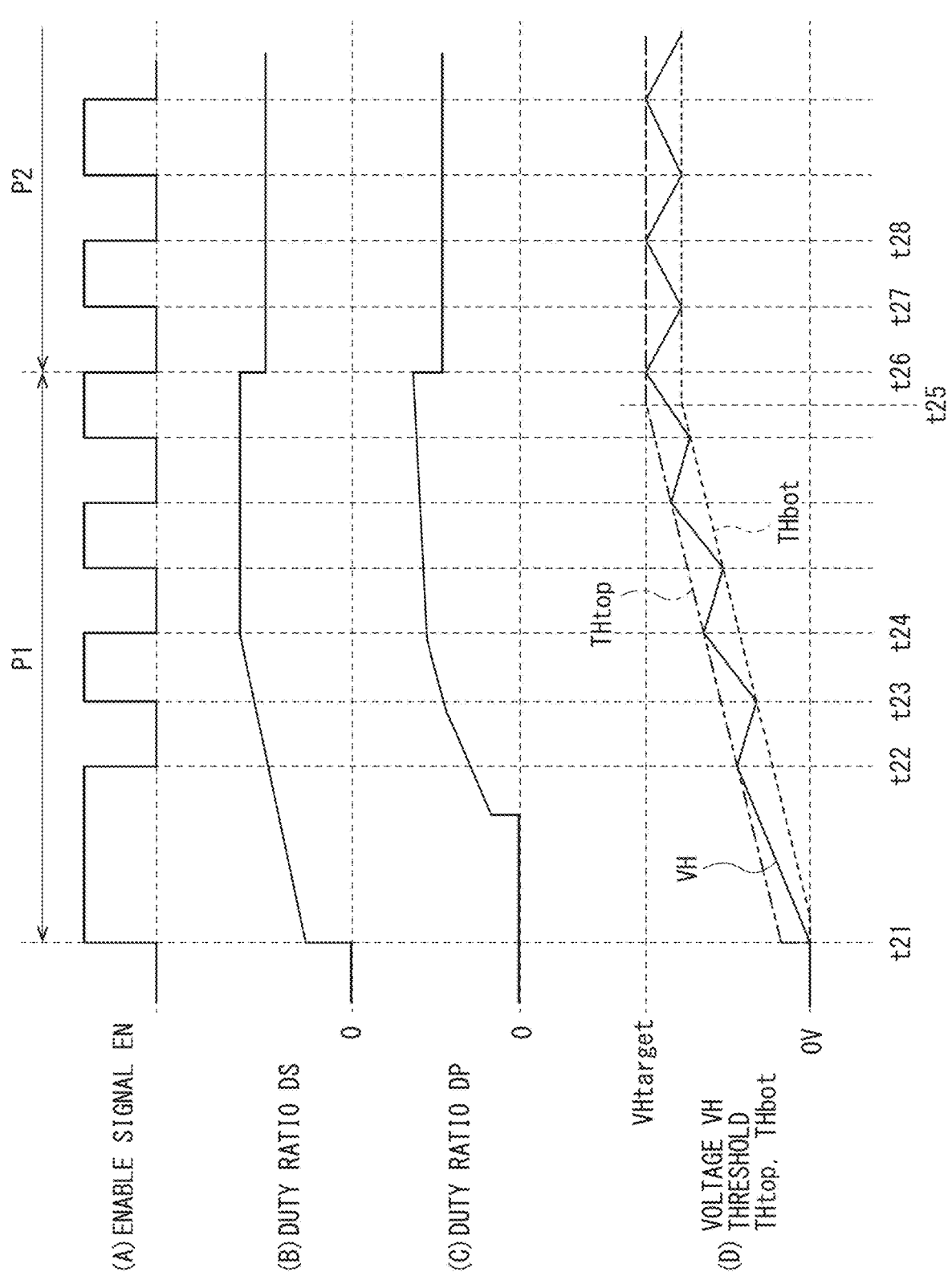
FIG. 6 is a timing chart illustrating an example of a precharge operation of the power conversion system illustrated in FIG. 1.

FIG. 6 illustrates an example of the precharge operation performed by the power conversion system 1. In FIG. 6, part (A) illustrates a waveform of the enable signal EN, part (B) illustrates the duty ratio DS of the switching operation of the rectifying circuit 14, part (C) illustrates the duty ratio DP of the switching operation of the switching circuit 12, and part (D) illustrates a waveform and the thresholds THtop and THbot of the voltage VH. FIG. 7 illustrates an operation example of the gate signal generators 28 and 29.

In this example, the precharge period P1 starts at a timing t21. The precharge controller 21 generates the duty ratios DP and DS to cause the duty ratios DP and DS to gradually increase in the precharge period P1 (parts (B) and (C) of FIG. 6). In this example, the precharge controller 21 generates the duty ratios DP and DS to cause the duty ratio DS to be 0.5 or less and cause the duty ratio DP to be less than or equal to the duty radio DS. Further, the threshold generator 25 generates the thresholds THtop and THbot to cause the thresholds THtop and THbot to gradually increase in the precharge period P1 (parts (D) of FIG. 6). The comparator 26 generates the enable signal EN by making comparisons between the voltage VH and the thresholds THtop and THbot (part (A) of FIG. 6). As illustrated in FIG. 7, when the enable signal EN is at the high level, the gate signal generator 28 generates the gate signals GC and GD, based on the duty ratio DP, and maintains the gate signals GA and GB at the low level; and when the enable signal EN is at the low level, the gate signal generator 28 maintains the gate signals GA to GD at the low level. When the enable signal EN is at the high level, the gate signal generator 29 generates the gate signals GE and GF, based on the duty ratio DS; and when the enable signal EN is at the low level, the gate signal generator 29 maintains the gate signals GE and GF at the low level.

At the timing t21, the power conversion system 1 starts the precharge operation. The comparator 26 changes the enable signal EN from the low level to the high level at this timing t21 (part (A) of FIG. 6). The gate signal generator 28 generates the gate signals GC and GD, based on the duty ratio DP (part (C) of FIG. 6), and the gate signal generator 29 generates the gate signals GE and GF (FIG. 7), based on the duty ratio DS (part (B) of FIG. 6). The power conversion apparatus 10 performs the switching operation, based on the gate signals GA to GF. Thus, the power conversion apparatus 10 supplies the electric power of the low voltage battery BL to the capacitor 9 and raises the voltage VH accordingly (part (D) of FIG. 6).

Once the voltage VH reaches the threshold THtop at a timing t22 (part (D) of FIG. 6), the comparator 26 changes the enable signal EN from the high level to the low level (part (A) of FIG. 6). The gate signal generator 28 maintains the gate signals GC and GD at the low level, and the gate signal generator 29 maintains the gate signals GE and GF at the low level. As a result, the power conversion apparatus 10 stops the switching operation, and the voltage VH drops (part (D) of FIG. 6).

Once the voltage VH reaches the threshold THbot at a timing t23 (part (D) of FIG. 6), the comparator 26 changes the enable signal EN from the low level to the high level (part (A) of FIG. 6). The gate signal generator 28 generates the gate signals GC and GD, based on the duty ratio DP (part (C) of FIG. 6), and the gate signal generator 29 generates the gate signals GE and GF, based on the duty ratio DS (part (B)

of FIG. 6). The power conversion apparatus 10 performs the switching operation, based on the gate signals GA to GF. Thus, the power conversion apparatus 10 supplies the electric power of the low voltage battery BL to the capacitor 9 and raises the voltage VH accordingly (part (D) or FIG. 6).

Once the voltage VH reaches the threshold THtop at a timing t24 (part (D) of FIG. 6), the comparator 26 changes the enable signal EN from the high level to the low level (part (A) of FIG. 6).

The power conversion system 1 repeats the operations performed during a period from the timing t22 to the timing t24. The gate signal generators 28 and 29 output the gate signals GC to GF in a period during which the enable signal EN is at the high level, and stops outputting the gate signals GC to GF during a period during which the enable signal EN is at the low level. In such a manner, the power conversion system 1 operates intermittently during the precharge period P1. As a result, the voltage VH oscillates between the threshold THtop and the threshold THbot. The voltage VH is controlled to fall within the voltage range less than or equal to the threshold THtop and greater than or equal to the threshold THbot. Because the thresholds THtop and THbot are each set to gradually increase with the passage of time in the precharge period P1, the voltage VH rises, being led by the thresholds THtop and THbot.

FIG. 8 illustrates a simulated waveform example of the precharge operation performed during a period, within the precharge period P1, during which the enable signal EN is at the high level. In FIG. 8, part (A) illustrates a waveform of each of the gate signals GE and GF, part (B) illustrates a waveform of each of the gate signals GC and GD, part (C) illustrates a waveform of a current (a charge current ICHG) flowing into the capacitor 9, part (D) illustrates a waveform of an excitation current IM of the transformer 13, (E) illustrates a waveform of a current (an inductor current IL) flowing through the choke inductor 16 from the voltage line L21B to the voltage line L21A, (F) illustrates a waveform of a voltage (a transformer voltage VTR2) of the winding 13B of the transformer 13 at the node N4 relative to that at the node N5, and (G) illustrates a waveform of the voltage VH. In FIG. 8, T represents a period of the switching operation.

In the precharge operation, the control circuit 19 generates the gate signals GC and GD, based on the duty ratio DP, and generates the gate signals GE and GF, based on the duty ratio DS. The duty ratio DP represents a pulse width of each of the gate signals GC and GD obtained with respect to the period T (a duration from a timing t41 to a timing t43) taken as "1", and the duty ratio DS represents a pulse width of each of the gate signals GE and GF obtained with respect to the period T taken as "1". As illustrated in parts (A) and (B) of FIG. 8, the control circuit 19 changes the gate signals GC and GF from the low level to the high level at the timing t41. Thereafter, the control circuit 19 changes the gate signal GC from the high level to the low level at a timing at which a time corresponding to the duty ratio DP (duty ratio DP×period T) has elapsed from the timing t41, and changes the gate signal GF from the high level to the low level at a timing at which a time corresponding to the duty ratio DS (duty ratio DS×period T) has elapsed from the timing t41. Thereafter, the control circuit 19 changes the gate signals GD and GE from the low level to the high level at a timing t42. Thereafter, the control circuit 19 changes the gate signal GD from the high level to the low level at a timing at which the time corresponding to the duty ratio DP (duty ratio DP×period T) has elapsed from the timing t42, and changes the gate signal GE from the high level to the low level at a timing at which the time corresponding to the duty ratio DS (duty ratio DS×period T) has elapsed from the timing t42. Although not illustrated, the control circuit 19 maintains the gate signals GA and GB at the low level. As a result, the charge current ICHG as illustrated in part (C) of FIG. 8 flows into the capacitor 9, and the voltage VH rises gradually (part (G) of FIG. 8).

In such a manner, the voltage VH rises during the period during which the enable signal EN is at the high level. A voltage gradient of the voltage VH illustrated in FIG. 6 is set by the duty ratios DP and DS. The greater the voltage gradient of the voltage VH is than the gradients of the thresholds THtop and THbot, the shorter time it takes for the voltage VH to change from the threshold THbot to the threshold THtop, and therefore the more frequently the enable signal EN (part (A) of FIG. 6) transitions.

In the example of FIG. 6, at and after a timing t25, the threshold generator 25 sets the threshold THtop to a value indicated by the target voltage command value VHtarget and sets the threshold THbot to a value corresponding to the target voltage command value VHtarget (part (D) of FIG. 6). However, this is non-limiting, and the threshold generator 25 may set the threshold THbot to the value indicated by the target voltage command value VHtarget and set the threshold THtop to a value corresponding to the target voltage command value VHtarget. Alternatively, the threshold generator 25 may set the threshold THtop to a value (e.g., VHtarget+ΔV1) corresponding to the target voltage command value VHtarget, and set the threshold THbot to a value (e.g., VHtarget−ΔV2) corresponding to the target voltage command value VHtarget. Here, ΔV1 and ΔV2 are any values corresponding to the target voltage command value VHtarget.

Thereafter, at a timing t26, the voltage VH reaches the threshold THtop that is the target voltage command value VHtarget (part (D) of FIG. 6). The precharge period P1 thus ends, and the voltage-maintaining period P2 starts. In the voltage-maintaining period P2, the precharge controller 21 sets the duty ratios DP and DS to respective predetermined values (parts (B) and (C) of FIG. 6). In this example, the precharge controller 21 sets the duty ratio DP to a value slightly lower than the value immediately before the timing t26, and sets the duty ratio DS to a value slightly lower than the value immediately before the timing t26. In the voltage-maintaining period P2, the duty ratio generators 23 and 24 generate the duty ratios DP and DS of respective values corresponding to the voltage VL. Note that this is non-limiting, and the duty ratio generators 23 and 24 may generate the duty ratios DP and DS by performing feedback control, based on the voltage VL.

Once the voltage VH reaches the threshold THtop at the timing t26 (part (D) of FIG. 6), the comparator 26 changes the enable signal EN from the high level to the low level (part (A) of FIG. 6). The gate signal generator 28 maintains the gate signals GC and GD at the low level, and the gate signal generator 29 maintains the gate signals GE and GF at the low level. As a result, the power conversion apparatus 10 stops the switching operation, and the voltage VH drops (part (D) of FIG. 6).

Once the voltage VH reaches the threshold THbot at a timing t27 (part (D) of FIG. 6), the comparator 26 changes the enable signal EN from the low level to the high level (part (A) of FIG. 6). The gate signal generator 28 generates the gate signals GC and GD, based on the duty ratio DP (part (C) of FIG. 6), and the gate signal generator 29 generates the gate signals GE and GF, based on the duty ratio DS (part (B) of FIG. 6). As a result, the power conversion apparatus 10 performs the switching operation, based on the gate signals GA to GF. Thus, the power conversion apparatus 10 supplies the electric power of the low voltage battery BL to the capacitor 9 and raises the voltage VH accordingly (part (D) or FIG. 6).

Once the voltage VH reaches the threshold THtop at a timing t28 (part (D) of FIG. 6), the comparator 26 changes the enable signal EN from the high level to the low level (part (A) of FIG. 6).

The power conversion system 1 repeats the operations performed during a period from the timing t26 to the timing t28. The gate signal generators 28 and 29 output the gate signals GC to GF in a period during which the enable signal EN is at the high level, and stops outputting the gate signals GC to GF during a period during which the enable signal EN is at the low level. In such a manner, the power conversion system 1 operates intermittently during the voltage-maintaining period P2. As a result, the voltage VH oscillates between the threshold THtop and the threshold THbot. The voltage VH is controlled to fall within the voltage range less than or equal to the threshold THtop and greater than or equal to the threshold THbot. Because the thresholds THtop and THbot are each set to a value corresponding to the target voltage command value VHtarget in the voltage-maintaining period P2, the voltage VH is maintained at or near the voltage indicated by the target voltage command value VHtarget.

In this way, according to the power conversion system 1, in a first period before electric power is supplied from the first power terminal (the terminals T11 and T12) toward the second power terminal (the terminals T21 and T22), the control circuit 19 generates the first threshold (the threshold THbot) that increases with the passage of time, and when the voltage value of the voltage VH at the first power terminal (the terminals T11 and T12) reaches the first threshold (the threshold THbot), the control circuit 19 performs switching from an output stop state in which output of the gate signals GE and GF is stopped to an output state in which the gate signals GE and GF are outputted. Further, in the first period, the control circuit 19 generates the second threshold (the threshold THtop) that increases with the passage of time and has a value greater than that of the first threshold (the threshold THbot), and when the voltage value of the voltage VH at the first power terminal (the terminals T11 and T12) reaches the second threshold (the threshold THtop), the control circuit 19 performs switching from the output state in which the gate signals GE and GF are outputted to the output stop state in which output of the gate signals GE and GF is stopped. The power conversion system 1 thus makes it possible for changes in the voltage VH to be controllable based on the thresholds THtop and THbot during the precharge period P1. Accordingly, it is possible for the power conversion system 1 to control various characteristics including, for example, a charge time involved in the precharge operation and the voltage gradient of the voltage VH in the precharge operation. Further, for example, when the capacitance value of the capacitor 9 is changed depending on the use, it is possible for the power conversion system 1 to make a charge characteristic of the precharge operation into a desired characteristic, regardless of the capacitance value of the capacitor 9. In this way, the power conversion system 1 makes it possible to set the charge characteristic of the precharge operation.

Further, in the power conversion system 1, output of the gate signals GE and GF is controlled based on the result of comparisons between the voltage VH and the thresholds THtop and THbot, as described above. This makes it possible for the power conversion system 1 to achieve a simple configuration because it is unnecessary to provide a current sensor used with the technique described in Patent Literature 1, for example.

Further, in the power conversion system 1, because the output of the gate signals GE and GF is controlled based on the result of comparisons between the voltage VH and the thresholds THtop and THbot as described above, the enable signal EN transitions as illustrated in FIG. 6 to allow for intermittent operation. Accordingly, in the power conversion system 1, it is possible to suppress a temperature rise of circuits including, for example, the switching circuit 12 and the rectifying circuit 14.

Effects

According to the present embodiment, as described above, in the first period before electric power is supplied from the first power terminal toward the second power terminal, the first threshold is generated that increases with the passage of time, and when the voltage value of a voltage at the first power terminal reaches the first threshold, switching is performed from the output stop state in which output of the gate signal is stopped to the output state in which the gate signal is outputted. Further, in the first period, the second threshold is generated that increases with the passage of time and has a value greater than that of the first threshold, and when the voltage value of the voltage at the first power terminal reaches the second threshold, switching is performed from the output state in which the gate signal is outputted to the output stop state in which the output of the gate signal is stopped. This allows for setting of the charge characteristic of the precharge operation with a simple configuration.

Modification Example 1

In the embodiment described above, as illustrated in FIG. 3, the gradient ktop of the threshold THtop and the gradient kbot of the threshold THbot are equal to each other in the precharge period P1; however, this is non-limiting. Alternatively, as illustrated in FIG. 9, the gradient ktop of the threshold THtop and the gradient kbot of the threshold THbot may be different from each other. In this case, the hysteresis amount HYS changes with the passage of time. In this example, the gradient ktop of the threshold THtop is made smaller than the gradient kbot of the threshold THbot. Accordingly, the hysteresis amount HYS gradually decreases with the passage of time.

Modification Example 2

In the embodiment described above, as illustrated in FIG. 3, the threshold THtop is increased linearly with the passage of time in the precharge period P1, and the threshold THbot is also increased linearly with the passage of time in the precharge period P1; however, this is non-limiting. Alternatively, for example, as illustrated in FIG. 10, the threshold THtop may be varied in a polygonal line, or the threshold THbot may be varied in a polygonal line. Note that this is non-limiting. For example, the threshold THtop may be varied in a curve, or the threshold THbot may be varied in a curve.

Modification Example 3

In the embodiment described above, the threshold generator 25 generates the two thresholds THtop and THbot, and the comparator 26 generates the enable signal EN by making comparisons between the voltage VH and the thresholds THtop and THbot; however, this is non-limiting. Alternatively, for example, operation may be performed based on only one of the two thresholds THtop and THbot. This will be described with reference to some examples below.

Figure 11:
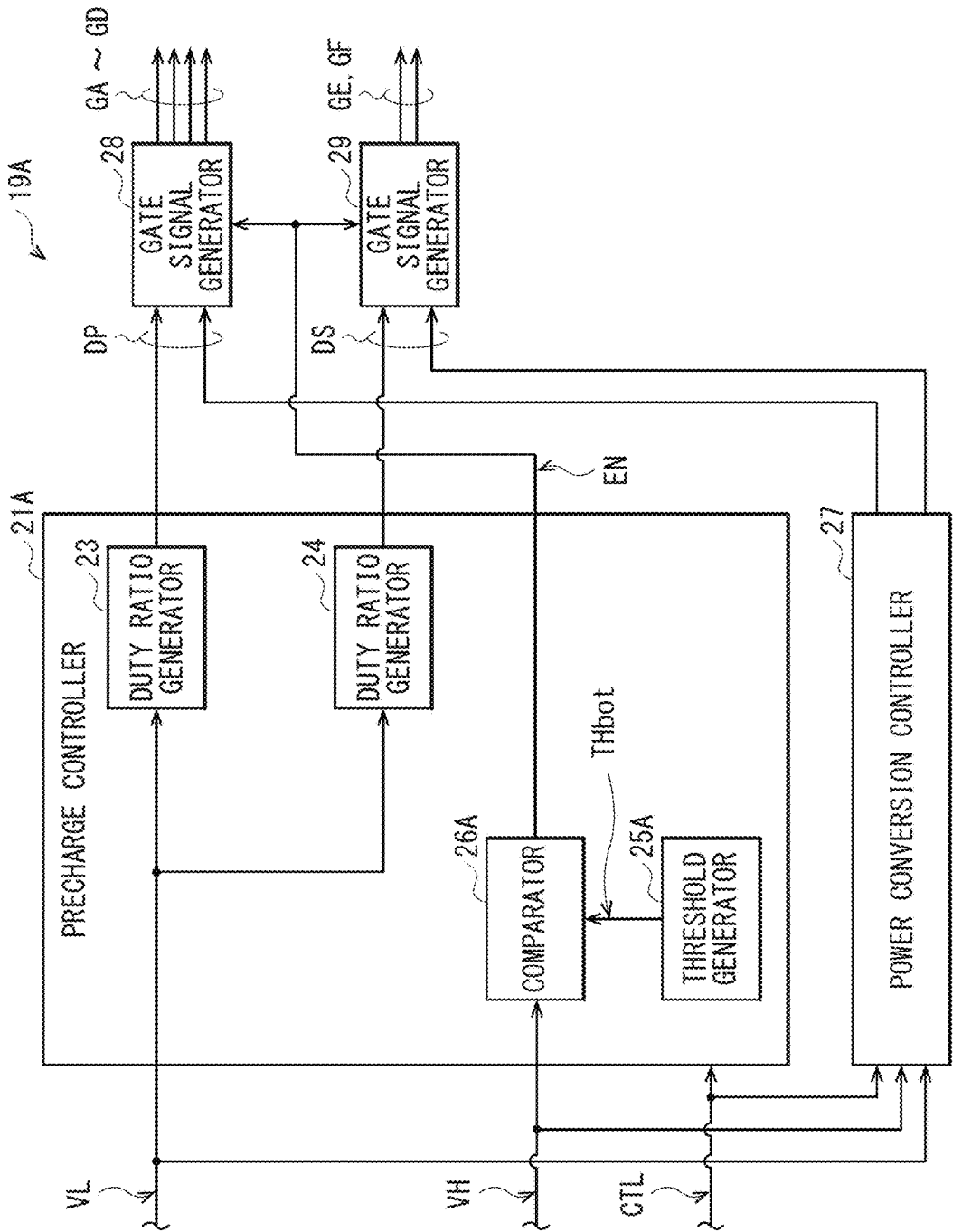
FIG. 11 is a block diagram illustrating a configuration example of a control circuit according to another modification example.

FIG. 11 illustrates a configuration example of a control circuit 19A according to the present modification example. The control circuit 19A includes a precharge controller 21A. The precharge controller 21A includes a threshold generator 25A and a comparator 26A. The threshold generator 25A is configured to generate the threshold THbot, based on the target voltage command value VHtarget of the voltage VH included in the control data CTL, in the precharge period P1 and the voltage-maintaining period P2. The comparator 26A is configured to generate the enable signal EN by making comparisons between the voltage VH and the threshold THbot in the precharge period P1 and the voltage-maintaining period P2.

Figure 12:
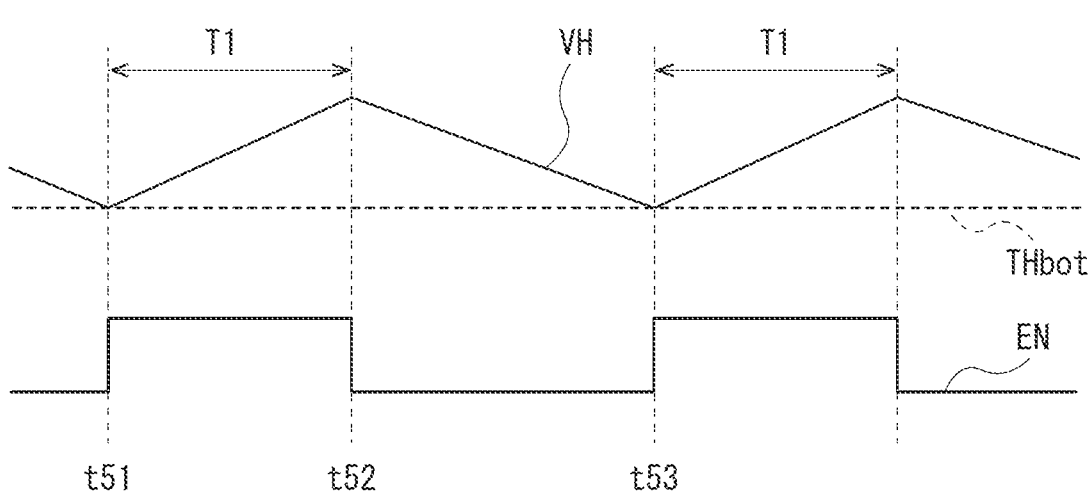
FIG. 12 is a timing chart illustrating an operation example of a comparator illustrated in FIG. 11.

FIG. 12 illustrates an operation example of the comparator 26A. For example, at a timing t51, the enable signal EN changes from the low level to the high level. Once the enable signal EN changes to the high level, the control circuit 19A outputs the gate signals GA to GF. The power conversion apparatus 10 performs the switching operation, based on the gate signals GA to GF. Thus, the power conversion apparatus 10 supplies the electric power of the low voltage battery BL to the capacitor 9 and raises the voltage VH accordingly. Thereafter, at a timing t52 at which a predetermined time T1 has elapsed from the timing t51, the comparator 26A changes the enable signal EN from the high level to the low level. Once the enable signal EN changes to the low level, the control circuit 19A maintains the gate signals GA to GF at the low level. As a result, the power conversion apparatus 10 stops the switching operation, and the voltage VH drops. Thereafter, once the voltage VH reaches the threshold THbot at a timing t53, the comparator 26A changes the enable signal EN from the low level to the high level. Subsequent operations are performed in a similar manner.

Figure 13:
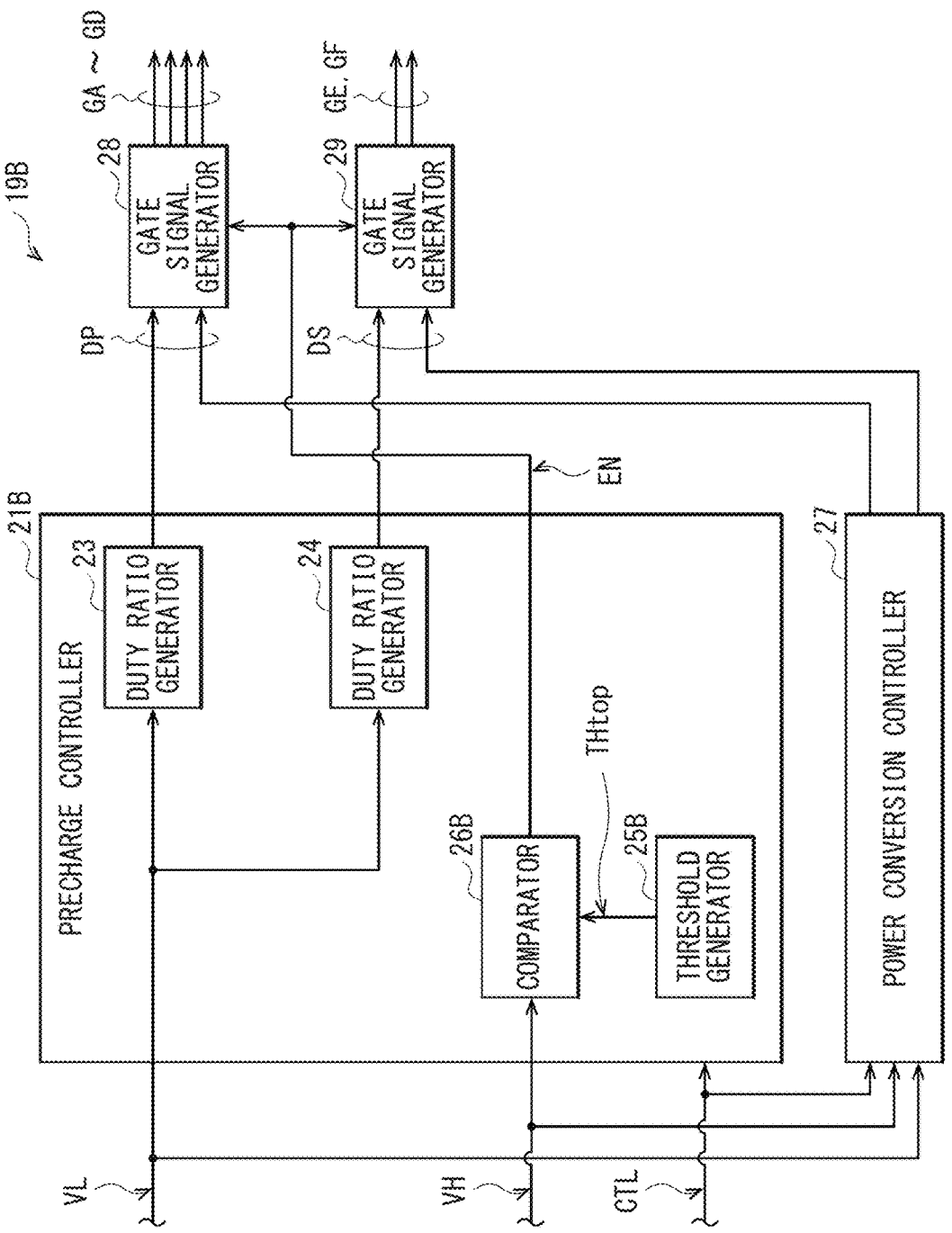
FIG. 13 is a block diagram illustrating a configuration example of a control circuit according to another modification example.

FIG. 13 illustrates a configuration example of another control circuit 19B according to the present modification example. The control circuit 19B includes a precharge controller 21B. The precharge controller 21B includes a threshold generator 25B and a comparator 26B. The threshold generator 25B is configured to generate the threshold THtop, based on the target voltage command value VHtarget of the voltage VH included in the control data CTL, in the precharge period P1 and the voltage-maintaining period P2. The comparator 26B is configured to generate the enable signal EN by making comparisons between the voltage VH and the threshold THtop in the precharge period P1 and the voltage-maintaining period P2.

Figure 14:
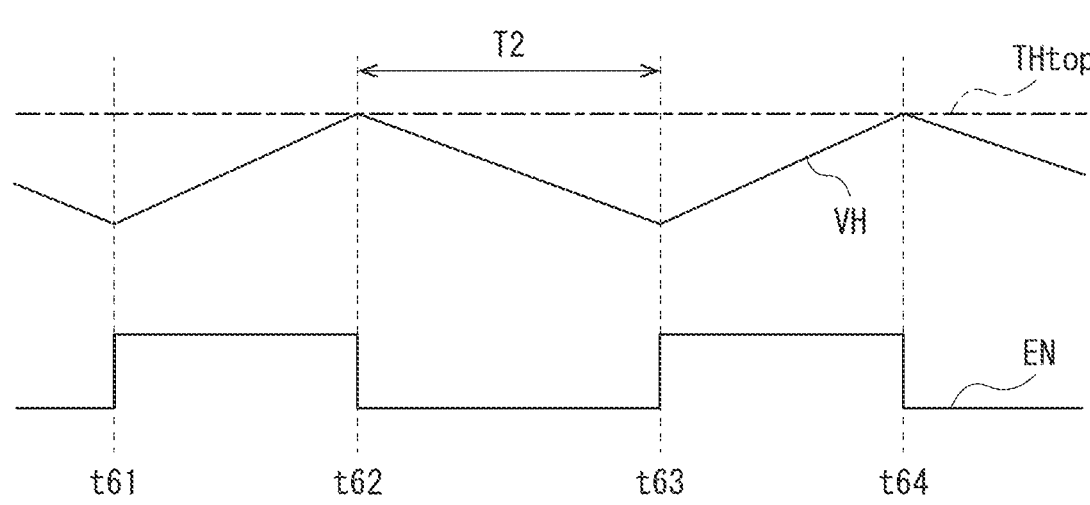
FIG. 14 is a timing chart illustrating an operation example of a comparator illustrated in FIG. 13.

FIG. 14 illustrates an operation example of the comparator 26B. For example, at a timing t61, the enable signal EN changes from the low level to the high level. Once the enable signal EN changes to the high level, the control circuit 19B outputs the gate signals GA to GF. The power conversion apparatus 10 performs the switching operation, based on the gate signals GA to GF. Thus, the power conversion apparatus 10 supplies the electric power of the low voltage battery BL to the capacitor 9 and raises the voltage VH accordingly. Thereafter, once the voltage VH reaches the threshold THtop at a timing t62, the comparator 26B changes the enable signal EN from the high level to the low level. Once the enable signal EN changes to the low level, the control circuit 19B maintains the gate signals GA to GF at the low level. As a result, the power conversion apparatus 10 stops the switching operation, and the voltage VH drops. Thereafter, at a timing t63 at which a predetermined time T2 has elapsed from the timing t62, the comparator 26B changes the enable signal EN from the low level to the high level. Subsequent operations are performed in a similar manner.

Modification Example 4

Figure 15:
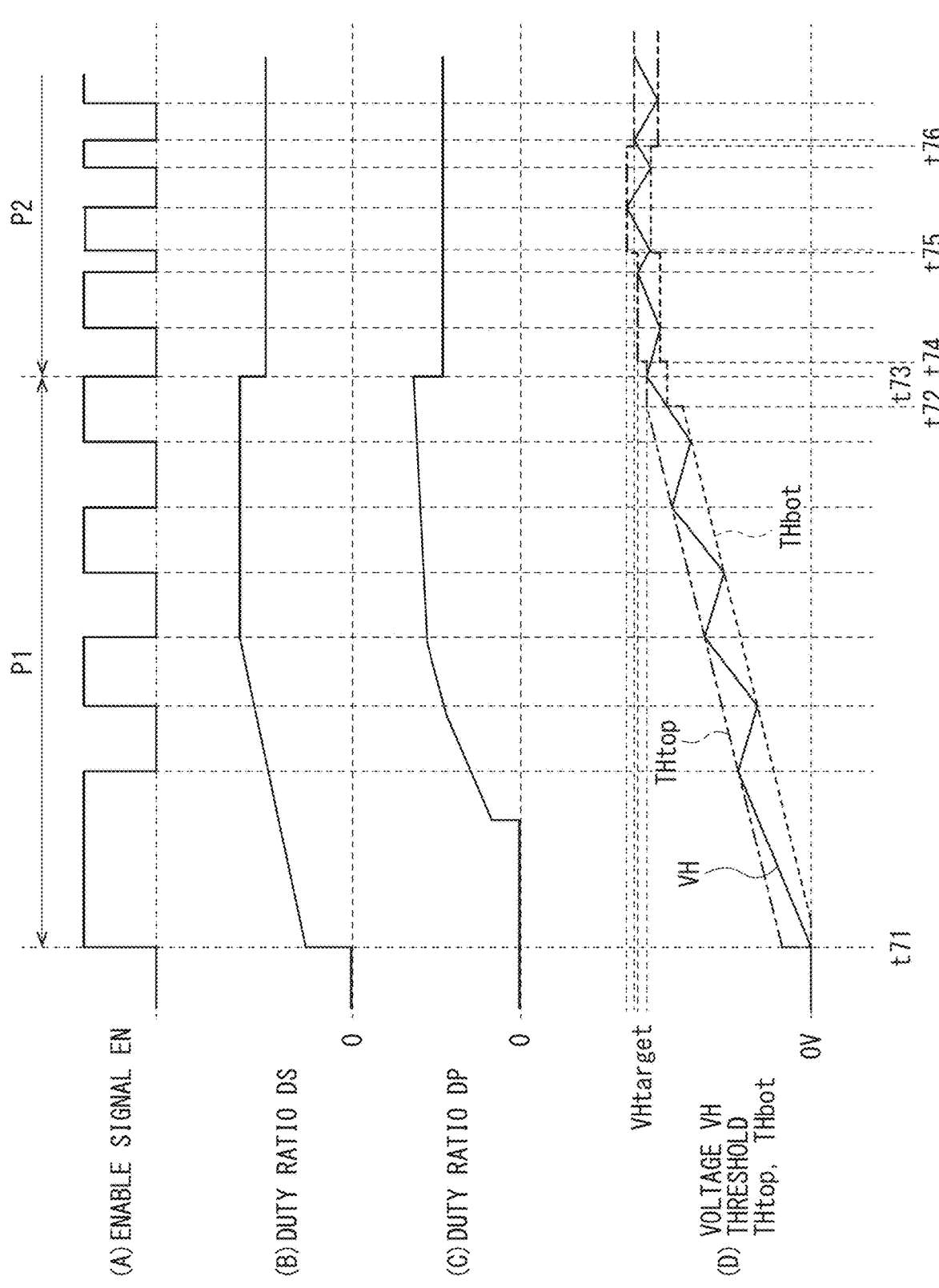
FIG. 15 is a timing chart illustrating an example of the precharge operation of a power conversion system according to another modification example.

In the embodiment described above, the threshold generator 25 generates the thresholds THtop and THbot, based on the target voltage command value VHtarget included in the control data CTL. For example, as illustrated in FIG. 15, when the target voltage command value VHtarget has been changed, the threshold generator 25 may update the thresholds THtop and THbot, based on the target voltage command value VHtarget having been changed. In this example, in a period up to a timing t72, the threshold generator 25 generates the thresholds THtop and THbot, based on the target voltage command value VHtarget, to cause the thresholds THtop and THbot to gradually increase. Thereafter, at the timing t72, the threshold generator 25 sets the thresholds THtop and THbot to respective values corresponding to the target voltage command value VHtarget. Thereafter, when the target voltage command value VHtarget has been changed, the threshold generator 25 sets the thresholds THtop and THbot, at a timing t74, to respective values corresponding to the target voltage command value VHtarget having been changed. In this example, the thresholds THtop and THbot change in a stepped manner at the timing t74. Thereafter, at each of timings t75 and t76 also, the threshold generator 25 similarly sets the thresholds THtop and THbot to respective values corresponding to the target voltage command value VHtarget having been changed.

Modification Example 5

Figure 16:
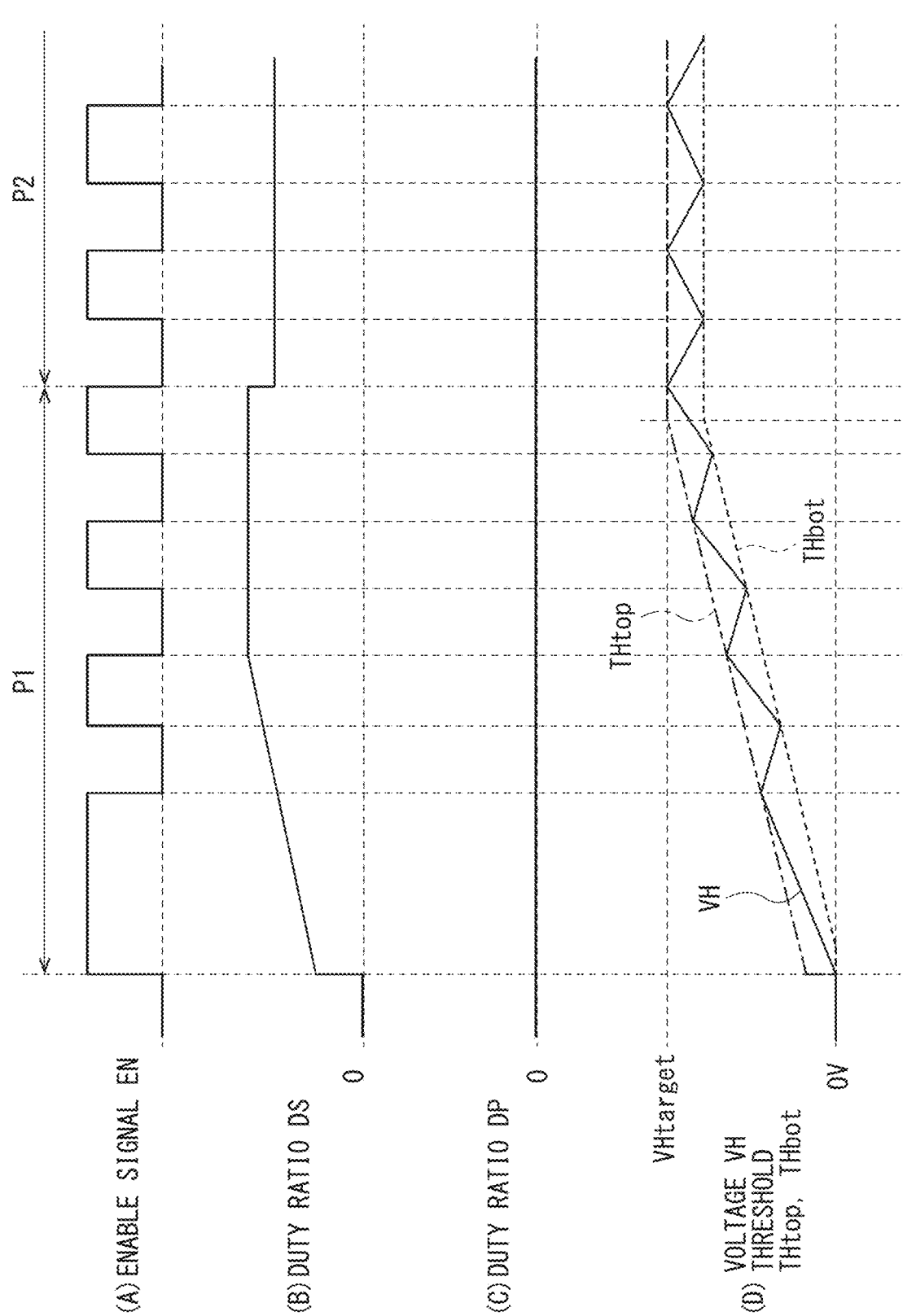
FIG. 16 is a timing chart illustrating an example of the precharge operation of a power conversion system according to another modification example.

In the embodiment described above, the control circuit 19 generates both the duty ratio DP and the duty ratio DS in the precharge period P1 and the voltage-maintaining period P2; however, this is non-limiting. Alternatively, for example, as illustrated in FIG. 16, the control circuit 19 may generate the duty ratio DS only and maintain the duty ratio DP at "0". In this case, the switching circuit 12 performs no switching operation, and the rectifying circuit 14 performs switching operation. Even in this case, setting the duty ratio DS to 0.5 or above allows for performing the precharge operation in a manner similar to that in a case of the above-described embodiment.

Modification Example 6

In the embodiment described above, the gate signal generators 28 and 29 operate based on the enable signal EN to thereby allow for output of the gate signals GA to GF and stop the output of the gate signals GA to GF; however, this is non-limiting. For example, the duty ratio generators may operate based on the enable signal EN to thereby allow for output of the gate signals GA to GF and stop the output of the gate signals GA to GF. The present modification example will be described in detail below.

Figure 17:
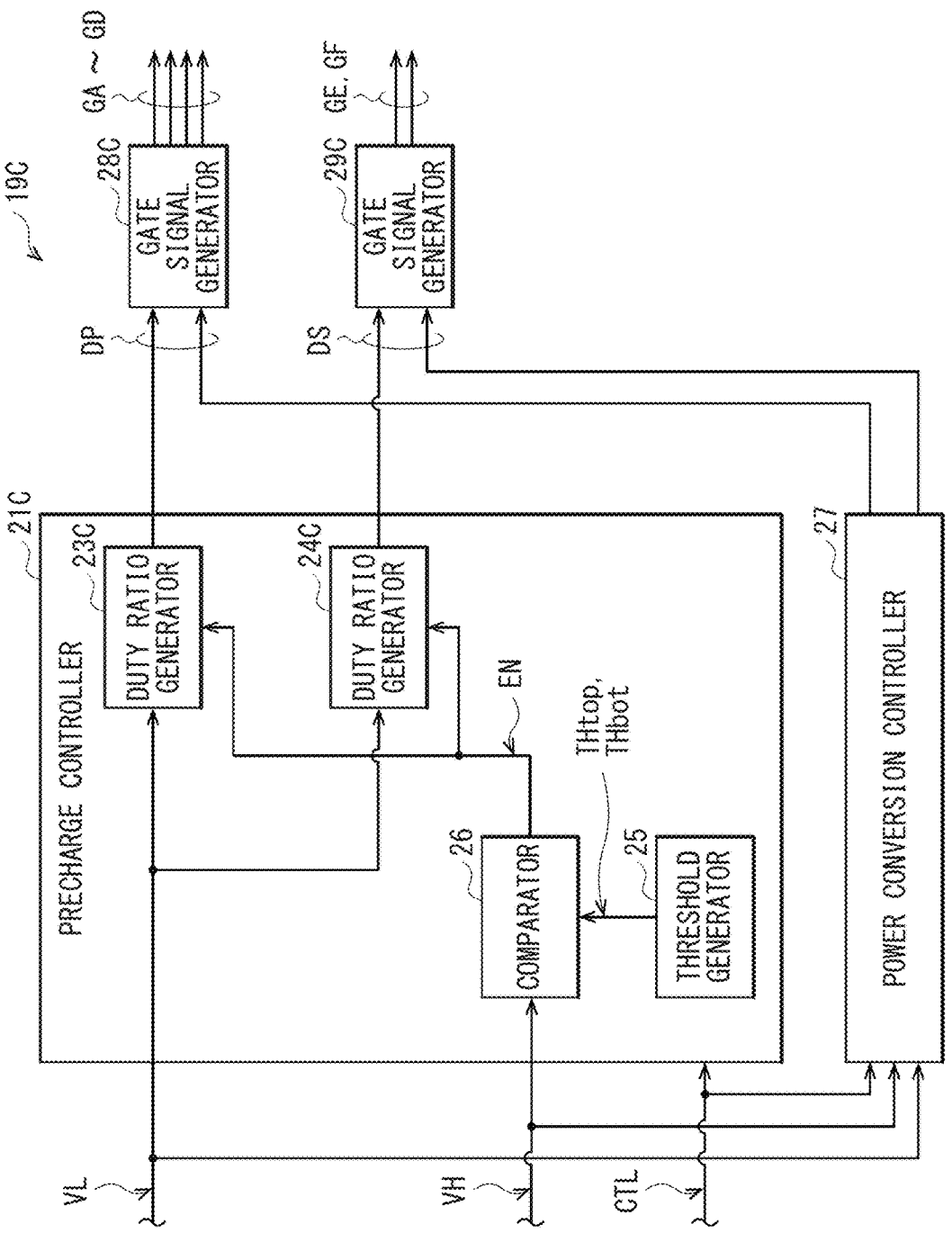
FIG. 17 is a block diagram illustrating a configuration example of a control circuit according to another modification example.

FIG. 17 illustrates a configuration example of a control circuit 19C according to the present modification example. The control circuit 19C includes a precharge controller 21C and gate signal generators 28C and 29C.

The precharge controller 21C includes duty ratio generators 23C and 24C. The duty ratio generator 23C is configured to generate the duty ratio DP, based on the voltage VL, when the enable signal EN is at the high level in the pre-charge period P1 and the voltage-maintaining period P2. The duty ratio generator 24C is configured to generate the duty ratio DS, based on the voltage VL, when the enable signal EN is at the high level in the pre-charge period P1 and the voltage-maintaining period P2.

The gate signal generator 28C is configured to generate the gate signals GA to GD, based on the duty ratio DP generated by the duty ratio generator 23C or by the power conversion controller 27. Specifically, in the precharge period P1 and the voltage-maintaining period P2, the gate signal generator 28C generates the gate signals GC and GD, based on the duty ratio DP generated by the duty ratio generator 23C, and maintains the gate signals GA and GB at the low level. Further, in the power conversion period P3, the gate signal generator 28C generates the gate signals GA to GD, based on the duty ratio DP generated by the power conversion controller 27.

The gate signal generator 29C is configured to generate the gate signals GE and GF, based on the duty ratio DS generated by the duty ratio generator 24C or by the power conversion controller 27. Specifically, in the precharge period P1 and the voltage-maintaining period P2, the gate signal generator 29C generates the gate signals GE and GF, based on the duty ratio DS generated by the duty ratio generator 24C. Further, in the power conversion period P3, the gate signal generator 29C generates the gate signals GE and GF, based on the duty ratio DS generated by the power conversion controller 27.

Figure 18:
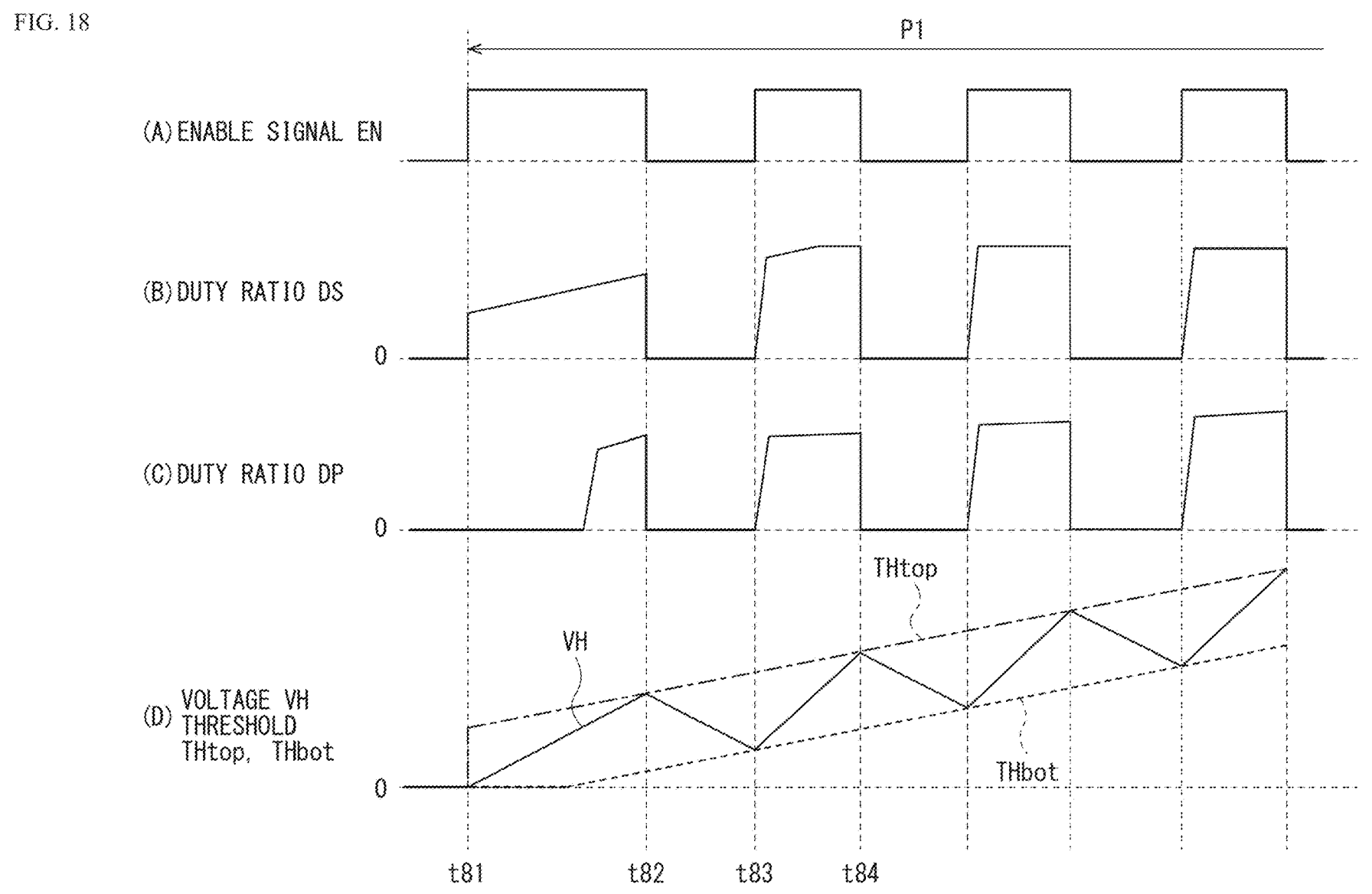

FIG. 18 illustrates an example of the precharge operation performed by the power conversion system 1 including the control circuit 19C. In FIG. 18, part (A) illustrates the waveform of the enable signal EN, part (B) illustrates the duty ratio DS of the switching operation of the rectifying circuit 14, part (C) illustrates the duty ratio DP of the switching operation of the switching circuit 12, and part (D) illustrates the waveform and the thresholds THtop and THbot of the voltage VH.

The power conversion system 1 starts the precharge operation at a timing t81. At the timing t81, the comparator 26 changes the enable signal EN from the low level to the high level (part (A) of FIG. 18). Based on the enable signal EN, the duty ratio generator 24C starts generating the duty ratio DS at the timing t81 (part (B) of FIG. 18), and the duty ratio generator 23C starts generating the duty ratio DP at a timing after the timing t81 (part (C) of FIG. 18). The gate signal generator 28C generates the gate signals GC and GD, based on the duty ratio DP, and the gate signal generator 29C generates the gate signals GE and GF, based on the duty ratio DS. The power conversion apparatus 10 performs the switching operation, based on the gate signals GA to GF. Thus, the power conversion apparatus 10 supplies the electric power of the low voltage battery BL to the capacitor 9 and raises the voltage VH accordingly (part (D) of FIG. 18).

Once the voltage VH reaches the threshold THtop at a timing t82 (part (D) of FIG. 18), the comparator 26 changes the enable signal EN from the high level to the low level (part (A) of FIG. 18). Based on the enable signal EN, the duty ratio generator 23C sets the duty ratio DS to "0" (part (B) of FIG. 18), and the duty ratio generator 24C sets the duty ratio DP to "0" (part (C) of FIG. 18). The gate signal generator 28C maintains the gate signals GC and GD at the low level, based on the duty ratio DP, and the gate signal generator 29C maintains the gate signals GE and GF at the low level, based on the duty ratio DS. As a result, the power conversion apparatus 10 stops the switching operation, and the voltage VH drops (part (D) of FIG. 18).

Once the voltage VH reaches the threshold THbot at a timing t83 (part (D) of FIG. 18), the comparator 26 changes the enable signal EN from the low level to the high level (part (A) of FIG. 18). Based on the enable signal EN, the duty ratio generator 23C starts generating the duty ratio DS (part (B) of FIG. 18), and the duty ratio generator 24C starts generating the duty ratio DP (part (C) of FIG. 18). At this time, the duty ratio generator 23C causes the duty ratio DS to gradually increase, and the duty ratio generator 24C causes the duty ratio DP to gradually increase. The gate signal generator 28C generates the gate signals GC and GD, based on the duty ratio DP, and the gate signal generator 29C generates the gate signals GE and GF, based on the duty ratio DS. The power conversion apparatus 10 performs the switching operation, based on the gate signals GA to GF. Thus, the power conversion apparatus 10 supplies the electric power of the low voltage battery BL to the capacitor 9 and raises the voltage VH accordingly (part (D) of FIG. 18).

Once the voltage VH reaches the threshold THtop at a timing t84 (part (D) of FIG. 18), the comparator 26 changes the enable signal EN from the high level to the low level (part (A) of FIG. 18).

The power conversion system 1 repeats the operations performed during a period from the timing t82 to the timing t84. In such a manner, in the power conversion system 1 according to the present modification example, the duty ratios DP and DS are set to "0" during a period during which the enable signal EN is at the low level, and when the enable signal EN has changed from the low level to the high level, the duty ratios DP and DS are caused to increase gradually. As a result, in the power conversion system 1, it is possible to reduce the inrush current occurring upon a change of the enable signal EN from the low level to the high level.

Modification Example 7

Figure 19:
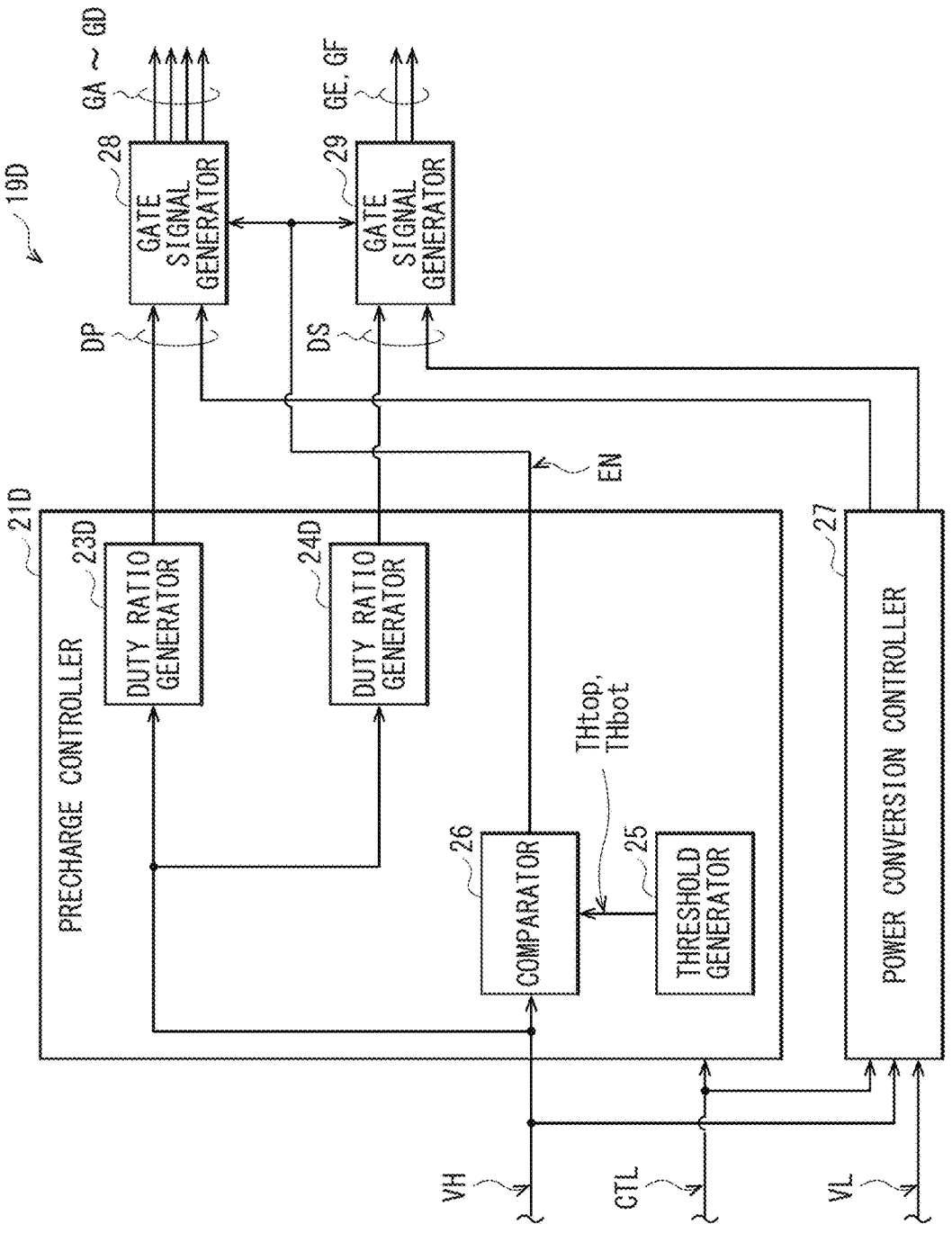
FIG. 19 is a block diagram illustrating a configuration example of a control circuit according to another modification example.

In the embodiment described above, the control circuit 19 generates the duty ratios DP and DS, based on the voltage VL, in the precharge period P1 and the voltage-maintaining period P2; however, this is non-limiting. Alternatively, for example, the duty ratios DP and DS may be generated based on the voltage VH, as in a case with a control circuit 19D illustrated in FIG. 19. The control circuit 19D includes a precharge controller 21D. The precharge controller 21D includes duty ratio generators 23D and 24D. The duty ratio generator 23D is configured to generate the duty ratio DP, based on the voltage VH, in the pre-charge period P1 and the voltage-maintaining period P2. The duty ratio generator 24D is configured to generate the duty ratio DS, based on the voltage VH, in the pre-charge period P1 and the voltage-maintaining period P2. For example, the duty ratio generators 23D and 24D may generate the duty ratios DP and DS of respective predetermined values corresponding to the voltage VH, or may generate the duty ratios DP and DS by performing feedback control, based on the voltage VH.

Modification Example 8

In the embodiment described above, as illustrated in FIG. 1, the full-bridge circuit is employed to configure the rectifying circuit 14; however, this is non-limiting, and various circuits are applicable. For example, what is called a center-tapped power conversion system may be provided. The present modification example will be described in detail below.

Figure 20:
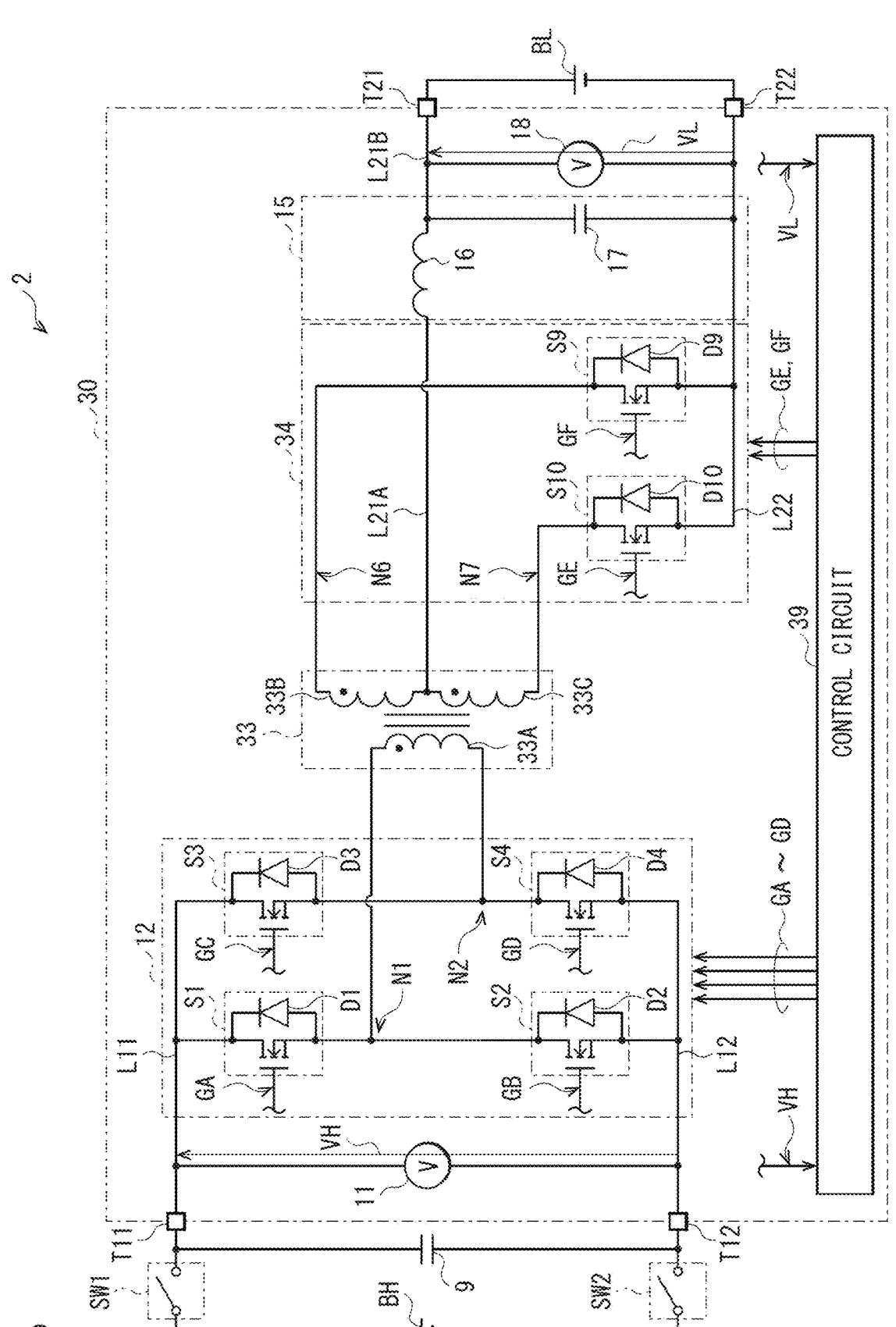
FIG. 20 is a circuit diagram illustrating a configuration example of a power conversion system according to another modification example.

FIG. 20 illustrates an example of a power conversion system 2 according to the present modification example. The power conversion system 2 includes a transformer 33, a rectifying circuit 34, and a control circuit 39.

The transformer 33 includes windings 33A, 33B, and 33C. The winding 33A has one end coupled to the node N1 in the switching circuit 12, and another end coupled to the node N2 in the switching circuit 12. The winding 33B has one end coupled to a node N6, and another end coupled to one end of the winding 33C and the voltage line L21A. The winding 33C has the one end coupled to the other end of the winding 33B and the voltage line L21A, and another end coupled to a node N7.

The rectifying circuit 34 includes transistors S9 and S10. The transistors S9 and S10 each include an N-type field-effect transistor, for example. The transistors S9 and S10 respectively include body diodes D9 and D10. The transistor S9 is provided on a path coupling the node N6 and the reference voltage line L22 to each other, and is configured to couple the node N6 to the reference voltage line L22 by being turned on. The transistor S9 has a drain coupled to the node N6, a gate to be supplied with the gate signal GF, and a source coupled to the reference voltage line L22. The transistor S10 is provided on a path coupling the node N7 and the reference voltage line L22 to each other, and is configured to couple the node N7 to the reference voltage line L22 by being turned on. The transistor S10 has a drain coupled to the node N7, a gate to be supplied with the gate signal GE, and a source coupled to the reference voltage line L22.

The control circuit 39 is configured to control the operation of the power conversion apparatus 30 by controlling the operations of the switching circuit 12 and the rectifying circuit 14, based on the voltage VH detected by the voltage sensor 11, the voltage VL detected by the voltage sensor 18, and the control data CTL supplied from the unillustrated system controller. Specifically, the control circuit 39 controls the operation of the power conversion apparatus 30 by generating the gate signals GA to GF, based on the voltages VH and VL, and by performing PWM control through the use of the gate signals GA to GF.

Similarly, in the embodiment described above, as illustrated in FIG. 1, the full-bridge circuit is employed to configure the switching circuit 12; however, this is non-limiting, and various circuits are applicable.

Other Modification Examples

Further, any two or more of these modification examples may be combined.

The disclosure has been described hereinabove with reference to the embodiment and the modification examples. However, the disclosure is not limited to the embodiment and the like, and may be modified in a variety of ways.

For example, in the embodiment described above, the step-down operation is performed in the power conversion operation; however, this is non-limiting, and a step-up operation may be performed.

Embodiments of the disclosure may be configured as follows.

(1) A power conversion apparatus including:
  a first power terminal;
  a switching circuit coupled to the first power terminal and including a plurality of first switching devices, the first switching devices being configured to be turned on and off based on a first driving signal;

a transformer including a first winding and a second winding, the first winding being coupled to the switching circuit;

a rectifying circuit coupled to the second winding and including a plurality of second switching devices, the second switching devices being configured to be turned on and off based on a second driving signal;

a smoothing circuit coupled to the rectifying circuit;

a second power terminal coupled to the smoothing circuit; and a control circuit configured to control operations of the first switching devices and the second switching devices, in which the control circuit is configured to, in a first period before electric power is supplied from the first power terminal toward the second power terminal, generate a first threshold that increases with passage of time, and perform, when a voltage value of a voltage at the first power terminal reaches the first threshold, switching from an output state to an output stop state, or switching from the output stop state to the output state, the output state being a state in which the second driving signal is outputted, the output stop state being a state in which output of the second driving signal is stopped.

(2)

The power conversion apparatus according to (1), in which the output state is a state in which the first driving signal and the second driving signal are outputted, and the output stop state is a state in which output of the first driving signal and the second driving signal is stopped.

(3)

The power conversion apparatus according to (1) or (2), in which the control circuit is configured to:

further generate, in the first period, a second threshold that increases with the passage of time and has a value greater than a value of the first threshold;

perform, when the voltage value reaches the first threshold, the switching from the output stop state to the output state; and perform, when the voltage value reaches the second threshold, the switching from the output state to the output stop state.

(4)

The power conversion apparatus according to (3), in which the control circuit is configured to, in a second period after the first period, set the first threshold to a first predetermined value and set the second threshold to a second predetermined value.

(5)

The power conversion apparatus according to (3), in which the control circuit is configured to change the first threshold and the second threshold, based on a control signal supplied from outside, in a second period after the first period.

(6)

The power conversion apparatus according to (1) or (2), in which the control circuit is configured to:

perform the switching from the output stop state to the output state when the voltage value reaches the first threshold; and perform the switching from the output state to the output stop state at a timing at which a predetermined length of time elapses from a timing at which the voltage value has reached the first threshold.

(7)

The power conversion apparatus according to (1) or (2), in which the control circuit is configured to:

perform the switching from the output state to the output stop state when the voltage value reaches the first threshold; and perform the switching from the output stop state to the output state at a timing at which a predetermined length of time elapses from a timing at which the voltage value has reached the first threshold.

(8)

The power conversion apparatus according to (6) or (7), in which the control circuit is configured to set the first threshold to a predetermined value in a second period after the first period.

(9)

The power conversion apparatus according to (6) or (7), in which the control circuit is configured to change the first threshold, based on a control signal supplied from outside, in a second period after the first period.

(10)

The power conversion apparatus according to any one of (1) to (9), in which the control circuit includes:

a comparator that makes a determination as to whether the voltage value has reached the first threshold;

a duty ratio generator configured to generate a duty ratio in the first period; and a driver configured to generate the second driving signal, based on the duty ratio, and to perform the switching from the output stop state to the output state, or the switching from the output state to the output stop state, based on a result of the determination made by the comparator.

(11)

The power conversion apparatus according to any one of (1) to (9), in which the control circuit includes:

a comparator that makes a determination as to whether the voltage value has reached the first threshold;

a duty ratio generator configured to generate a duty ratio in the first period, based on a result of the determination made by the comparator; and a driver configured to generate the second driving signal, based on the duty ratio.

(12)

The power conversion apparatus according to (10) or (11), in which the duty ratio generator is configured to, in a second period after the first period, generate the duty ratio by performing feedback control, based on a voltage at the first power terminal or a voltage at the second power terminal.

(13)

A power conversion system including:

a first battery including a first terminal and a second terminal;

a capacitor including a first terminal and a second terminal;

a first switch provided on a path coupling the first terminal of the first battery and the first terminal of the capacitor to each other;

a second switch provided on a path coupling the second terminal of the first battery and the second terminal of the capacitor to each other;

a power conversion apparatus; and a second battery, in which the power conversion apparatus includes

23 a first power terminal including a first coupling terminal and a second coupling terminal, the first coupling terminal being coupled the first terminal of the capacitor, the second coupling terminal being coupled to the second terminal of the capacitor, a switching circuit coupled to the first power terminal and including a plurality of first switching devices, the first switching devices being configured to be turned on and off based on a first driving signal, a transformer including a first winding and a second winding, the first winding being coupled to the switching circuit, a rectifying circuit coupled to the second winding and including a plurality of second switching devices, the second switching devices being configured to be turned on and off based on a second driving signal, a smoothing circuit coupled to the rectifying circuit, a second power terminal coupled to the smoothing circuit, and a control circuit configured to control operations of the first switching devices and the second switching devices, and the control circuit is configured to, in a first period before electric power is supplied from the first power terminal toward the second power terminal, generate a first threshold that increases with passage of time, and perform, when a voltage value of a voltage at the first power terminal reaches the first threshold, switching from an output state to an output stop state, or switching from the output stop state to the output state, the output state being a state in which the second driving signal is outputted, the output stop state being a state in which output of the second driving signal is stopped.

The power conversion apparatus and the power conversion system according to the respective embodiments of the disclosure each make it possible to set the charge characteristic in the precharge operation with a simple configuration.

The present application claims the benefit of Japanese Priority Patent Application JP2021-164651 filed with the Japan Patent Office on Oct. 6, 2021, the entire contents of which are incorporated herein by reference.

The invention claimed is:

1. A power conversion apparatus comprising:

a first power terminal;

a switching circuit coupled to the first power terminal and including a plurality of first switching devices, the first switching devices being configured to be turned on and off based on a first driving signal;

a transformer including a first winding and a second winding, the first winding being coupled to the switching circuit;

a rectifying circuit coupled to the second winding and including a plurality of second switching devices, the second switching devices being configured to be turned on and off based on a second driving signal;

a smoothing circuit coupled to the rectifying circuit;

a second power terminal coupled to the smoothing circuit; and a control circuit configured to control operations of the first switching devices and the second switching devices, wherein the control circuit is configured to, in a first period before electric power is supplied from the first power terminal toward the second power terminal,

24 generate a first threshold that increases with passage of time, and perform, when a voltage value of a voltage at the first power terminal reaches the first threshold, switching from an output state to an output stop state, or switching from the output stop state to the output state, the output state being a state in which the second driving signal is outputted, the output stop state being a state in which output of the second driving signal is stopped.

2. The power conversion apparatus according to claim 1, wherein the output state is a state in which the first driving signal and the second driving signal are outputted, and the output stop state is a state in which output of the first driving signal and the second driving signal is stopped.

3. The power conversion apparatus according to claim 1, wherein the control circuit is configured to:

further generate, in the first period, a second threshold that increases with the passage of time and has a value greater than a value of the first threshold;

perform, when the voltage value reaches the first threshold, the switching from the output stop state to the output state; and perform, when the voltage value reaches the second threshold, the switching from the output state to the output stop state.

4. The power conversion apparatus according to claim 3, wherein the control circuit is configured to, in a second period after the first period, set the first threshold to a first predetermined value and set the second threshold to a second predetermined value.

5. The power conversion apparatus according to claim 3, wherein the control circuit is configured to change the first threshold and the second threshold, based on a control signal supplied from outside, in a second period after the first period.

6. The power conversion apparatus according to claim 1, wherein the control circuit is configured to:

perform the switching from the output stop state to the output state when the voltage value reaches the first threshold; and perform the switching from the output state to the output stop state at a timing at which a predetermined length of time elapses from a timing at which the voltage value has reached the first threshold.

7. The power conversion apparatus according to claim 1, wherein the control circuit is configured to:

perform the switching from the output state to the output stop state when the voltage value reaches the first threshold; and perform the switching from the output stop state to the output state at a timing at which a predetermined length of time elapses from a timing at which the voltage value has reached the first threshold.

8. The power conversion apparatus according to claim 6, wherein the control circuit is configured to set the first threshold to a predetermined value in a second period after the first period.

9. The power conversion apparatus according to claim 6, wherein the control circuit is configured to change the first threshold, based on a control signal supplied from outside, in a second period after the first period.

10. The power conversion apparatus according to claim 1, wherein the control circuit includes:

a comparator configured to make a determination as to whether the voltage value has reached the first threshold;

a duty ratio generator configured to generate a duty ratio in the first period; and a driver configured to generate the second driving signal, based on the duty ratio, and to perform the switching from the output stop state to the output state, or the switching from the output state to the output stop state, based on a result of the determination made by the comparator.

11. The power conversion apparatus according to claim 1, wherein the control circuit includes:

a comparator configured to make a determination as to whether the voltage value has reached the first threshold;

a duty ratio generator configured to generate a duty ratio in the first period, based on a result of the determination made by the comparator; and a driver configured to generate the second driving signal, based on the duty ratio.

12. The power conversion apparatus according to claim 10, wherein the duty ratio generator is configured to, in a second period after the first period, generate the duty ratio by performing feedback control, based on a voltage at the first power terminal or a voltage at the second power terminal.

13. A power conversion system comprising:

a first battery including a first terminal and a second terminal;

a capacitor including a first terminal and a second terminal;

a first switch provided on a path coupling the first terminal of the first battery and the first terminal of the capacitor to each other;

a second switch provided on a path coupling the second terminal of the first battery and the second terminal of the capacitor to each other;

a power conversion apparatus; and a second battery, wherein the power conversion apparatus includes a first power terminal including a first coupling terminal and a second coupling terminal, the first coupling terminal being coupled the first terminal of the capacitor, the second coupling terminal being coupled to the second terminal of the capacitor, a switching circuit coupled to the first power terminal and including a plurality of first switching devices, the first switching devices being configured to be turned on and off based on a first driving signal, a transformer including a first winding and a second winding, the first winding being coupled to the switching circuit, a rectifying circuit coupled to the second winding and including a plurality of second switching devices, the second switching devices being configured to be turned on and off based on a second driving signal, a smoothing circuit coupled to the rectifying circuit, a second power terminal coupled to the smoothing circuit, and a control circuit configured to control operations of the first switching devices and the second switching devices, and the control circuit is configured to, in a first period before electric power is supplied from the first power terminal toward the second power terminal, generate a first threshold that increases with passage of time, and perform, when a voltage value of a voltage at the first power terminal reaches the first threshold, switching from an output state to an output stop state, or switching from the output stop state to the output state, the output state being a state in which the second driving signal is outputted, the output stop state being a state in which output of the second driving signal is stopped.

* * * * *